(12) United States Patent
  Zwimpfer

(10) Patent No.: US 11,241,078 B2
(45) Date of Patent: Feb. 8, 2022

(54) ORAL HYGIENE HANDLE DEVICE

(71) Applicant: TRISA Holding AG, Triengen (CH)

(72) Inventor: Martin Zwimpfer, Lucerne (CH)

(73) Assignee: TRISA HOLDING AG, Triengen (CH)

( * ) Notice: Subject to any disclaimer, the term of this patent is extended or adjusted under 35 U.S.C. 154(b) by 384 days.

(21) Appl. No.: 16/085,249

(22) PCT Filed: Mar. 14, 2017

(86) PCT No.: PCT/EP2017/055972
  § 371 (c)(1),
  (2) Date: Sep. 14, 2018

(87) PCT Pub. No.: WO2017/157927
  PCT Pub. Date: Sep. 21, 2017

(65) Prior Publication Data
  US 2019/0075919 A1    Mar. 14, 2019

(30) Foreign Application Priority Data
  Mar. 15, 2016  (EP) .................................... 16160311

(51) Int. Cl.
  *A46B 5/02*  (2006.01)
  *A46B 17/02* (2006.01)
  *A61C 15/04* (2006.01)

(52) U.S. Cl.
  CPC .............. *A46B 5/021* (2013.01); *A46B 17/02* (2013.01); *A46B 2200/108* (2013.01); *A46B 2200/1066* (2013.01); *A61C 15/046* (2013.01)

(58) Field of Classification Search
  CPC ....... A61C 15/046; A46B 5/021; A46B 17/02; A46B 2200/1066; A46B 2200/108
  See application file for complete search history.

(56) References Cited

U.S. PATENT DOCUMENTS

| 1,495,675 | A | * | 5/1924 | Colt | .................. | A46B 15/0055 |
|---|---|---|---|---|---|---|
| | | | | | | 132/309 |
| 2,105,709 | A | * | 1/1938 | Violette | ................. | A46B 11/00 |
| | | | | | | 222/512 |
| 4,023,580 | A | * | 5/1977 | Pieters | ................... | A45D 44/18 |
| | | | | | | 132/311 |

(Continued)

FOREIGN PATENT DOCUMENTS

| DE | 202013003230 U1 | * 7/2014 | ........... A46B 5/0095 |
|---|---|---|---|
| WO | 2009/011548 A1 | 1/2009 | |

OTHER PUBLICATIONS

Search Report dated Oct. 14, 2016 issued in corresponding EP patent application No. 16160311.3 (and English machine translation attached).

(Continued)

*Primary Examiner* — Nicholas D Lucchesi
(74) *Attorney, Agent, or Firm* — Oliff PLC

(57) ABSTRACT

An oral hygiene handle device is configured for a holding of an oral-hygiene means, in particular an interdental brush, with at least one base body comprising at least one accommodation region for an accommodation of the oral-hygiene means in an application position wherein the accommodation region of the base body is longer than 30 mm, and is configured for an accommodation of a handle element of the oral-hygiene means.

20 Claims, 14 Drawing Sheets

(56) References Cited

U.S. PATENT DOCUMENTS

Figure 1:
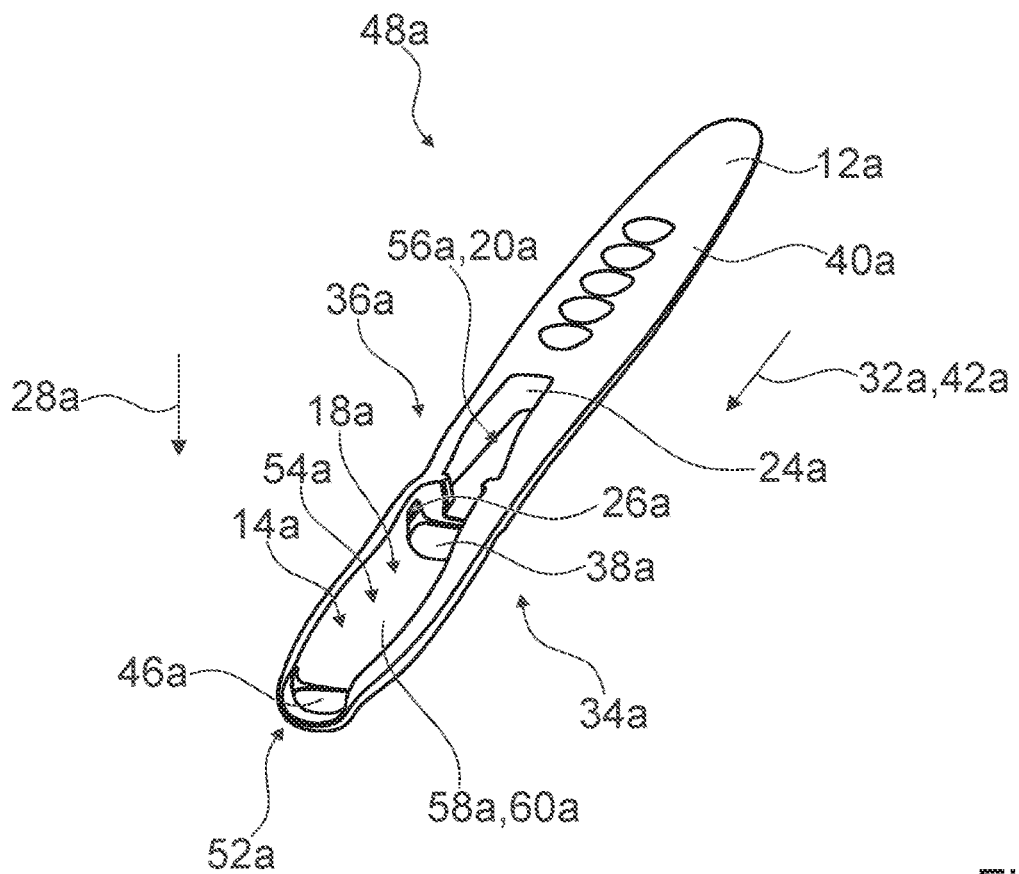

| | | | | |
|---|---|---|---|---|
| 4,275,750 | A | * | 6/1981 | Clark .................... A45D 44/18 132/311 |
| 4,387,479 | A | * | 6/1983 | Kigyos ................... A46B 7/04 132/308 |
| D296,271 | S | * | 6/1988 | Kobayashi .................. D24/154 |
| 5,005,246 | A | * | 4/1991 | Yen-Hui ............ A46B 15/0081 15/111 |
| 5,046,212 | A | * | 9/1991 | O'Conke .......... A46B 15/0055 15/105 |
| 5,097,852 | A | * | 3/1992 | Wu .................... A46B 15/0069 132/309 |
| 5,117,848 | A | * | 6/1992 | Huang ................. A46B 11/001 132/308 |
| 5,377,377 | A | * | 1/1995 | Bredall ............... A46B 5/0033 15/167.1 |
| 5,377,703 | A | * | 1/1995 | Chou ..................... A46B 7/04 132/311 |
| 5,896,615 | A | * | 4/1999 | Zaksenberg ............. A46B 7/04 15/143.1 |
| 5,934,295 | A | * | 8/1999 | Gekhter .................. A46B 7/04 132/309 |
| 5,967,152 | A | * | 10/1999 | Rimkus .................. A46B 9/026 132/308 |
| 5,974,618 | A | * | 11/1999 | Dumler ................ A46B 5/0075 15/167.1 |
| 6,220,773 | B1 | * | 4/2001 | Wiegner ............ A46B 11/0006 401/195 |
| 6,247,477 | B1 | * | 6/2001 | Wagner .................. A45D 44/18 132/309 |
| 6,446,640 | B1 | * | 9/2002 | Gekhter ............. A46B 15/0055 132/309 |
| 6,957,467 | B2 | * | 10/2005 | Cabedo-Deslierres ...................... A46B 5/0016 132/328 |
| 7,237,974 | B2 | * | 7/2007 | Pfenniger .......... A46B 15/0061 401/123 |
| 7,310,846 | B1 | * | 12/2007 | Archibeque ......... A46B 5/0008 15/106 |
| 8,540,918 | B2 | * | 9/2013 | Pfenniger ............... A61C 15/02 264/275 |
| 10,426,251 | B2 | * | 10/2019 | Sprosta .............. A46B 11/0027 |
| 10,660,430 | B2 | * | 5/2020 | Jimenez .................. A46B 5/02 |
| 10,791,823 | B2 | * | 10/2020 | Lee ...................... A46B 5/0095 |
| 10,869,740 | B2 | * | 12/2020 | Zwimpfer ............ A61C 15/046 |
| 2002/0073496 | A1 | | 6/2002 | Kim |
| 2006/0269351 | A1 | * | 11/2006 | McAfee ............... A46B 11/001 401/125 |
| 2012/0111348 | A1 | * | 5/2012 | Prokopchuk ........... A61C 15/02 132/200 |
| 2012/0275841 | A1 | | 11/2012 | Jimenez et al. |
| 2015/0257519 | A1 | | 9/2015 | Stefanson et al. |
| 2016/0113743 | A1 | * | 4/2016 | Lu .......................... A61C 15/00 15/167.2 |
| 2019/0105138 | A1 | * | 4/2019 | To ......................... A61C 15/043 |

OTHER PUBLICATIONS

International Search Report of the International Searching Authority dated May 18, 2017 issued in corresponding International Patent Application No. PCT/EP2017/055972 (English version attached).
International Preliminary Report on Patentability dated Sep. 18, 2018 issued in corresponding International Patent Application No. PCT/EP2017/055972 (English version attached).

* cited by examiner

ORAL HYGIENE HANDLE DEVICE

CROSS REFERENCE TO RELATED APPLICATIONS

This application is a U.S. national stage application of PCT/EP2017/055972 filed on Mar. 14, 2017, which is based on European Patent Application No. 16160311.3 filed on Mar. 15, 2016, the contents of which are incorporated herein by reference.

STATE OF THE ART

The invention concerns an oral hygiene handle device according to the preamble of patent claim 1.

From EP 0 980 219 B1 a handle for an exchangeable interdental-brush-head is already known, in which the exchangeable head is fixatable to the handle in two orientations. The exchangeable head comprises a fixation region for a fixation to the handle as well as an interdental brush that is arranged at an angle to the fixation region. As a result of the angled arrangement in the exchangeable interdental-brush head, there are two different angles between the interdental brush and the handle for the two orientations of a fixation of the exchangeable head on the handle.

Moreover, from the company INAVA, a handle is known comprising an accommodation for exchangeable interdental-brush attachments, to which an exchangeable attachment for a straight application is fixatable in such a way that a brush of the exchangeable attachment extends in parallel to the handle (INAVA is a registered wordmark). The exchangeable attachment is furthermore fixatable in such a way that a fixation region of the brush of the exchangeable attachment is bent off, including a 60-degree angle with the handle.

Beyond this, from US 2015/0257519 A1 a toothbrush is known with an accommodation arranged in a handle of the toothbrush, in which an interdental-brush dental cleaning means may be stowed.

The objective of the invention is in particular to provide a generic oral hygiene handle device having improved characteristics regarding multifold ways of handling. The objective is achieved, according to the invention, by the features of patent claims 1 and 2, while advantageous implementations and further developments of the invention may be gathered from the subclaims.

Advantages of the Invention

The invention is based on an oral hygiene handle device, which is configured for a holding of an oral-hygiene means, in particular an interdental brush, with at least one base body comprising at least one accommodation region for an accommodation of the oral-hygiene means in an application position.

It is proposed that the accommodation region of the base body is longer than 30 mm, advantageously longer than 35 mm, especially advantageously longer than 40 mm, and is configured for an accommodation of a handle element of the oral-hygiene means.

By the implementation according to the invention, in particular improved handling and/or handling in multiple ways are/is achievable. Advantageously a high level of comfort is achievable. Moreover, it is in particular possible to provide an especially comfortable and/or ergonomic handle lengthening. Furthermore an advantageously high degree of ergonomics is achievable in a usage. Moreover in particular an oral-hygiene means may be held in a secure and/or controlled and/or easy manner. It is also possible to guide an interdental brush for dental cleaning purposes in an easy and/or controlled manner. It is further advantageously possible to safely store an oral-hygiene means and/or, for example, deposit an oral-hygiene means in a dental-cleaning beaker and/or transport an oral-hygiene means in a sponge bag. It is furthermore possible to achieve advantageous characteristics regarding cost-efficient and/or simple and/or fast production.

An "oral hygiene handle device" is in particular to mean a component, in particular a structural and/or functional component, of an oral hygiene handle that is advantageously configured for a one-handed usage and for holding an oral-hygiene means, in particular for a dental cleaning application. Preferentially the oral hygiene handle device comprises the whole oral hygiene handle. It is however also conceivable that the oral hygiene handle device is part of a toothbrush, e.g. an electrical toothbrush, in particular of a handle region of a toothbrush or of another oral-hygiene product. All of the solutions for an oral hygiene handle device described in this document may also be configured as a gripping zone of a toothbrush or of another oral-hygiene product. The toothbrush head or the usage end of the oral-hygiene product is configured on the end of the oral hygiene handle device that is situated opposite the accommodation region of the oral-hygiene means. "Configured" is in particular to mean specifically designed and/or equipped. By an object being configured for a certain function is in particular to be understood that the object fulfills and/or implements said certain function in at least one application state and/or operation state.

An "oral-hygiene means" is in particular to mean an interdental brush and/or an interdental cleaner and/or a flosser and/or a flosser with a tooth pick and/or a flosser with an interdental cleaner and/or a tongue cleaner and/or a toothpick. The oral-hygiene means may herein in particular be a symmetrically-designed flosser, which means that a dental floss and in particular a plurality of or all the elements of the flosser are symmetrical with respect to a longitudinal axis. The flosser may moreover in particular be a flosser which is embodied, at least partially, non-symmetrically. The flosser may in particular also be designed as a refillable dental floss holder, in which it is in particular possible to pull the dental floss further, thus replacing or generally exchanging the dental floss. Furthermore, an "oral-hygiene means" may also mean a non-reusable or reusable toothbrush or a tongue cleaner. Advantageously the oral-hygiene means is configured for an alternative application, in which the oral-hygiene means is used alone, in particular without the oral hygiene handle device. Advantageously the oral-hygiene means comprises at least one oral-hygiene means base body. Preferably the oral-hygiene means base body is at least partially, particularly preferably at least to a large extent, embodied of a synthetic material. The term "at least to a large extent" is herein in particular to mean at least by 55%, advantageously at least by 65%, preferentially at least by 75%, particularly preferably at least by 85% and especially advantageously at least by 95%. Advantageously the synthetic material comprises at least one hard component. It is furthermore conceivable that the synthetic material comprises at least one soft component. By a "hard component" is herein in particular a synthetic material from the field of thermoplastic materials to be understood, e.g. a hard synthetic material implemented of a styrene polymerisate, e.g. styrene acrylonitrile (SAN) or polystyrene (PS) or acrylonitrile butadiene styrene (ABS) or styrene methyl methacrylate (SMMA) or styrene butadiene (SB) and/or a polyolefin like, for example, polypropylene (PP), or a polyethylene (PE), in particular high-density or low-density polyethylene (HDPE/LDPE), and/or a polyester like, for example, an, in particular acid-modified or glycol-modified, polyethylene terephthalate (PETA/PETG) or polybutylene terephthalate (PBT) or an acid-modified polycyclohexylene dimethylene terephthalate (PCT-A) or a glycol-modified polycyclohexylene dimethylene terephthalate (PCT-G) and/or a cellulose derivate like, for example, a cellulose acetate (CA) or a cellulose aceto-butyrate (CAB) or a cellulose propionate (CP) or a cellulose acetate phthalate (CAP) or a cellulose butyral (CB), and/or a polyamide, like PA 6.6 or PA 6.10 or PA 6.12, and/or a polymethyl methacrylate (PMMA) and/or polycarbonate (PC) and/or polyoxymethylene (POM) and/or polyvinyl chloride (PVC) and/or polyurethane (PUR). In particular, the hard component has an elasticity modulus of at least 500 N/mm$^2$, advantageously at least 1000 N/mm$^2$ and especially advantageously at least 1300 N/mm$^2$. In particular, the hard component has an elasticity modulus of maximally 3000 N/mm$^2$, advantageously of maximally 2400 N/mm$^2$ and particularly advantageously of no more than 1800 N/mm$^2$. Particularly preferably a PP is used as a hard component. By a "soft component" is in particular a soft synthetic material to be understood, advantageously a synthetic material from the field of thermoplastics like, for example, a thermoplastic polyurethane elastomer (TPE-U), a thermoplastic styrene elastomer (TPE-S) like, for example, a styrene-ethylene-butylene-styrene copolymer (SEBS) or a styrene-butadiene-styrene copolymer (SBS), and/or a thermoplastic polyamide elastomer (TPE-A) and/or a thermoplastic polyolefin elastomer (TPE-O) and/or a thermoplastic polyester elastomer (TPE-E) and/or a polyethylene (PE) and/or a polyurethane (PU). In particular the soft component has an elasticity modulus of at least 1 N/mm$^2$, advantageously of at least 10 N/mm$^2$ and especially advantageously of at least 50 N/mm$^2$. In particular the soft component has an elasticity modulus of maximally 1000 N/mm$^2$, advantageously no more than 500 N/mm$^2$ and especially advantageously no more than 200 N/mm$^2$. A Shore A hardness of the soft component is advantageously smaller than 200, particularly advantageously smaller than 90. Especially preferentially a TPE-S is used as a soft component.

So-called bio-synthetics, which are produced from renewable raw materials, may principally also be used as a hard component and/or soft component.

It is, for example, conceivable that the oral-hygiene means base body comprises at least one first region with at least one hard component. It is further conceivable that the oral-hygiene means base body comprises at least one second region with at least one soft component. Preferably the first region is arranged in a central region of the oral-hygiene means base body, in particular relative to a geometric-center axis of the oral-hygiene means base body that is arranged in parallel to a main extension direction of the oral-hygiene means base body. By a "main extension direction" of an object is herein in particular a direction to be understood which extends in parallel to a longest edge of a smallest imaginary rectangular cuboid just still entirely enclosing the object. Particularly preferably the second region implements at least one handle region. Advantageously the oral-hygiene means base body implements at least one handle element. Especially advantageously the handle element is configured for a holding of the oral-hygiene means, in particular with one hand, advantageously in at least one alternative usage, in particular without the oral hygiene handle device. Advantageously the oral-hygiene means base body is embodied in a more or less round shape and/or in a shape of a rectangular cuboid and/or flat. Particularly advantageously the oral-hygiene means base body has a cross section which is implemented mirror-symmetrically to at least one plane, in particular to a plane that is parallel to the main extension direction of the oral-hygiene means base body. Preferentially the oral-hygiene means base body has a cross section that changes along the main extension direction of the oral-hygiene means base body. It is however also conceivable that the oral-hygiene means base body has an at least substantially constant cross section. By an object having an "at least substantially constant cross section" is herein in particular to be understood that, for any first cross section of the object along at least one direction and for any second cross section of the object along the direction, a minimum area content of a differential area that is realized by laying the cross sections over one another is maximally 20%, advantageously no more than 10% and especially advantageously no more than 5% of the area content of the larger cross section of the two. In particular, it is conceivable that the oral-hygiene means base body has an at least substantially ellipse-shaped or circle-shaped cross section. By an object having an "at least substantially ellipse-shaped/circle-shaped cross section" is herein in particular to be understood that, for at least 60%, advantageously at least 70%, particularly advantageously no less than 80% and preferably at least 90% of all cross sections of the object along at least one direction, an area content of a differential area of the cross section and a smallest circle/a smallest ellipse encompassing the cross section is maximally 30%, advantageously maximally 20%, especially advantageously no more than 10% and preferably maximally 5% of the area content of the circle/ellipse.

In particular, the oral-hygiene means base body has a length of at least 30 mm, advantageously at least 45 mm and particularly advantageously at least 55 mm. In particular, the oral-hygiene means base body has a length of maximally 100 mm, advantageously no more than 80 mm and particularly advantageously no more than 60 mm. In particular, the oral-hygiene means base body has a width of at least 3 mm, advantageously no less than 5 mm and particularly advantageously no less than 7 mm. In particular, the oral-hygiene means base body has a width of maximally 20 mm, advantageously of no more than 15 mm and particularly advantageously of maximally 12 mm. In particular, the oral-hygiene means base body has a height of at least 2 mm, advantageously of at least 4 mm and especially advantageously of no less than 6 mm. In particular, the oral-hygiene means base body has a height of maximally 10 mm, advantageously of maximally 8 mm and especially advantageously of no more than 7 mm.

It is however also conceivable that the oral-hygiene means is embodied as an exchangeable part, which is not usable without the oral hygiene handle device. In particular, it is conceivable that the oral-hygiene means base body is embodied as a connection element, which is configured for a fixation to the oral hygiene handle device.

If the oral-hygiene means is embodied as an exchangeable part, the oral-hygiene means base body in particular has a length of at least 10 mm, advantageously no less than 15 mm and especially advantageously at least 20 mm. If the oral-hygiene means is embodied as an exchangeable part, the oral-hygiene means base body in particular has a length of maximally 35 mm, advantageously no more than 30 mm and especially advantageously no more than 25 mm. If the oral-hygiene means is embodied as an exchangeable part, the oral-hygiene means base body in particular has a width and/or a height of at least 2 mm, advantageously at least 3 mm and especially advantageously at least 5 mm. If the oral-hygiene means is embodied as an exchangeable part, the oral-hygiene means base body in particular has a width and/or a height of maximally 10 mm, advantageously maximally 8 mm and especially advantageously no more than 6 mm. The exchangeable part is in this case implemented rather simply and is made of only one synthetic component as the requirements to the part are reduced relative to oral-hygiene means which are also usable alone. The exchangeable part is designed, in regard to a handle geometry, in such a way that it optimally cooperates with the interface of the oral hygiene handle device. Furthermore the volume is maximally reduced.

Particularly preferably at least one oral-hygiene means base body blank is produced in an injection-molding procedure, wherein the respective hard component(s) and/or soft component(s) preferentially realize a substance-to-substance bond subsequently to an injection-molding of the soft component(s) onto the hard component(s). It is however also conceivable to realize the geometric design of bodies in such a way that the components are connected in a form-fit manner. Advantageously the oral-hygiene means base body is embodied to be at least partially elastically bendable, in particular perpendicularly to the main extension direction of the oral-hygiene means base body.

Advantageously the oral-hygiene means comprises at least one cleaning zone, which is configured for a dental cleaning application, in particular in an oral space. Preferably the cleaning zone comprises at least one cleaning element. Particularly preferably the cleaning zone is connected to the oral-hygiene means base body, in particular in a one-part implementation. Connected in a "one-part implementation" is in particular to mean connected at least by substance-to-substance bond, respectively material bond, e.g. by a welding process, a gluing process, an injection-molding process and/or any other process deemed expedient by someone skilled in the art, and/or advantageously formed in one piece like, for example, by a production in one casting and/or in a one-component or multi-component injection-molding process, and advantageously from a single blank. It is conceivable that the cleaning element is fixated to the oral-hygiene means base body by an injection-molding process and/or by plug-in and/or by screwing-in and/or gluing.

In particular, the cleaning element is embodied as a brush, advantageously as an interdental brush head, and/or as a dental floss, which is in particular fastened to a holding bracket, and/or as a toothpick and/or as a tongue cleaner. If the cleaning element is embodied as a brush, the cleaning element in particular has a length of at least 5 mm, advantageously no less than 8 mm and particularly advantageously no less than 10 mm. If the cleaning element is embodied as a brush, it has in particular a length of maximally 25 mm, advantageously no more than 17 mm and especially advantageously no more than 15 mm. A length of the cleaning element herein in particular extends from a point of the cleaning element that is the nearest to the oral-hygiene means base body (e.g. a point of exit from the base body), which is arranged outside the oral-hygiene means base body, to a point of the cleaning element that is the farthest away from the oral-hygiene means base body. Preferably a length of the cleaning element extends at least substantially parallel to the main extension direction of the oral-hygiene means base body. "At least substantially parallel" is herein in particular to mean an orientation of a direction relative to a reference direction, in particular in a plane, wherein the direction has a deviation from the reference direction that is in particular smaller than 8°, advantageously smaller than 5° and especially advantageously smaller than 2°. If the cleaning element is embodied as a brush, the cleaning element in particular has a width and/or a height of at least 1 mm, advantageously of no less than 2 mm and particularly advantageously of at least 3 mm. If the cleaning element is embodied as a brush, the cleaning element in particular has a width and/or a height of maximally 10 mm, advantageously of maximally 7 mm and particularly advantageously of maximally 5 mm.

If the cleaning element is embodied as a brush, the cleaning element advantageously features at least one rotary symmetry, in particular relative to a main extension direction of the cleaning element. The cleaning element may, for example, be embodied, at least section-wise, at least substantially cylinder-shaped and/or at least substantially cone-shaped and/or at least substantially truncated-cone-shaped and/or at least substantially pyramid-shaped. By an "at least substantially cylinder-shaped/cone-shaped/truncated-cone-shaped/pyramid-shaped object" is herein in particular an object to be understood for which a differential volume of the object and a smallest cylinder/cone/truncated cone/pyramid encompassing the object is maximally 30%, advantageously no more than 20%, especially advantageously no more than 10% and preferably no more than 5% of the volume of the cylinder/cone/truncated cone/pyramid. It is further conceivable that the cleaning element has a circle-shaped and/or ellipse-shaped and/or round and/or triangular and/or quadrangular and/or polygonal cross section, in particular perpendicularly to the main extension direction of the cleaning element. The cleaning element may moreover have an, at least section-wise, concave and/or convex and/or undulate and/or straight profile, in particular along the main extension direction of the cleaning element.

It is also conceivable that the oral-hygiene means comprises at least one protective cap, which is configured to at least partially cover a cleaning zone. In particular, the protective cap is configured to be slid over the cleaning zone along a direction that is at least substantially parallel to the main extension direction of the oral-hygiene means base body. Advantageously the protective cap features at least one protective-cap opening, which is configured to be slid over the cleaning zone when the protective cap is plugged onto the oral-hygiene means base body. Especially advantageously, in a plugged-on state of the protective cap, the cleaning zone is arranged within the protective cap, at least to a large extent. Preferably the protective cap is at least partially adapted to a shape of the oral-hygiene means base body. Advantageously the protective cap is implemented in such a way that it is pluggable onto an end of the oral-hygiene means base body or of the oral hygiene handle device that faces away from the cleaning zone.

Advantageously the base body of the oral hygiene handle device is implemented at least partially, particularly advantageously at least to a large extent, of a synthetic material. Advantageously the synthetic material comprises at least one hard component. It is, for example, conceivable that the base body comprises at least one first region with at least one hard component. It is further conceivable that the base body comprises at least one second region with at least one soft component. Preferably the first region is arranged in a central region of the base body, in particular relative to a geometric-center axis of the base body that is arranged in parallel to a main extension direction of the base body. In particular, the second region may have a different coloring and/or a different surface structure than the first region.

In particular, the base body has a length of at least 60 mm, advantageously of at least 100 mm and especially advantageously of at least 115 mm. In particular, the base body has a length of maximally 250 mm, advantageously of maximally 180 mm and especially advantageously of no more than 135 mm. In particular, the base body has a height of at least 3 mm, advantageously of no less than 4 mm and especially advantageously of no less than 5 mm. In particular, the base body has a height of maximally 15 mm, advantageously of maximally 12 mm and especially advantageously of maximally 8 mm. In particular, the base body has a width of at least 7 mm, advantageously of at least 10 mm and especially advantageously of at least 12 mm. In particular, the base body has a width of maximally 25 mm, advantageously of no more than 18 mm and particularly advantageously of no more than 15 mm. Preferentially the base body has a cross section which is embodied mirror-symmetrically relative to at least one plane, in particular to a plane in parallel to the main extension direction of the base body. Preferably the base body has a cross section changing along the main extension direction of the base body. In particular, the base body is at least section-wise implemented in a waisted fashion. Advantageously the base body is configured to be held with a hand, in particular with a palm and/or with a thumb.

In particular, the accommodation region is implemented as a recess in the base body. Advantageously a shape of the accommodation region is adapted to a shape of the oral-hygiene means, in particular to a shape of the oral-hygiene means base body. In particular, the accommodation region is configured to at least partly accommodate the oral-hygiene means. In particular, the accommodation region is configured to accommodate the oral-hygiene means base body at least partly, advantageously to a large extent. In particular, a length of the accommodation region corresponds at least substantially to a length of the oral-hygiene means base body. By "at least substantially" is in particular to be understood, in this context, that a deviation from a given value is in particular equivalent to less than 25%, preferentially to less than 15% and particularly preferably to less than 5% of the given value. Preferably the accommodation region is arranged on an underside of the base body. Particularly preferably the underside of the base body extends parallel to the main extension direction of the base body. Advantageously a main extension direction of the accommodation region extends at least substantially parallel to the main extension direction of the base body. Especially advantageously the accommodation region is at least partly open towards a front face of the base body. Preferably the front face of the base body extends, at least section-wise, at least substantially perpendicularly to the main extension direction of the base body. By "at least substantially perpendicularly" is herein in particular an orientation of a direction relative to a reference direction, in particular in a reference plane, to be understood, wherein the direction and the reference direction include an angle which deviates from a right angle in particular by less than 8°, advantageously by less than 5° and especially advantageously by less than 2°. Preferably the accommodation region comprises at least one access opening, which is configured for an introduction of the oral-hygiene means into the accommodation region at least substantially perpendicularly to the main extension direction of the base body. Advantageously the access opening is arranged on the underside of the base body. It is however also conceivable that the accommodation region has an access opening, which is configured for an introduction of the oral-hygiene means into the accommodation region at least substantially in parallel to the main extension direction of the base body. It is further conceivable that the access opening is arranged on the front end of the oral-hygiene means.

By an "accommodation of the oral-hygiene means in an application position" is herein in particular a fixation of the oral-hygiene means relative to the base body to be understood, wherein in particular a guidance and/or movement of the cleaning zone of the fixated oral-hygiene means is made possible by a moving and/or guidance of the base body during a dental cleaning application. In particular, in the application position the cleaning zone of the oral-hygiene means is arranged, in a projection onto the main extension direction of the base body, at least partly beside the base body. Preferably the accommodation region is configured for holding the oral-hygiene means in the application position, wherein the cleaning zone of the oral-hygiene means projects beyond the base body, in particular on the front face of the base body. Advantageously the accommodation region is configured for holding the oral-hygiene means in the application position, wherein a main extension direction of the cleaning zone extends at least substantially parallel to the main extension direction of the base body.

The invention is furthermore based on an oral hygiene handle device which is configured for a holding of an oral-hygiene means, in particular an interdental brush, with at least one base body comprising at least one accommodation region for an accommodation of the oral-hygiene means in an application position.

It is proposed that the base body comprises at least one stowage region for an accommodation of the oral-hygiene means in a stowage position.

By the implementation according to the invention, in particular an improved and/or multifold manageability are/is achievable. Advantageously a high level of comfort is achievable. Furthermore, it is in particular possible to provide an especially comfortable and/or ergonomic handle lengthening. Moreover, an advantageously high ergonomics level is achievable in an application. Furthermore, in particular an oral-hygiene means may be held in a secure and/or controlled and/or easy manner. Beyond this an interdental brush may be guided, for the purpose of a dental cleaning, in an easy and/or controlled manner. Moreover it is advantageously possible to securely store an oral-hygiene means and/or, for example, deposit an oral-hygiene means in a beaker for dental cleaning and/or transport an oral-hygiene means in a sponge bag. Furthermore advantageous characteristics are achievable as regards a cost-efficient and/or simple and/or fast production.

In particular, the stowage region is implemented as a recess in the base body. Advantageously a shape of the stowage region is adapted to a shape of the oral-hygiene means, in particular to a shape of the cleaning zone of the oral-hygiene means. In particular, the stowage region is configured to accommodate the oral-hygiene means at least partially. Preferably the stowage region is configured to accommodate the cleaning zone of the oral-hygiene means at least partially, advantageously at least to a large extent. In particular, a length of the stowage region corresponds at least substantially to a length of the oral-hygiene means. Preferentially the stowage region is arranged on an underside of the base body. Especially preferentially the underside of the base body extends parallel to the main extension direction of the base body. Advantageously a main extension direction of the stowage region extends at least substantially in parallel to the main extension direction of the base body. Preferably the stowage region comprises at least one access opening, which is configured for an introduction of the oral-hygiene means, in particular of the cleaning zone of the oral-hygiene means, into the accommodation region at least substantially perpendicularly to the main extension direction of the base body. Advantageously the access opening of the stowage region is arranged on the underside of the base body. It is however also conceivable that the stowage region comprises an access opening which is configured for an introduction of the oral-hygiene means into the accommodation region at least substantially in parallel to the main extension direction of the base body. In particular, in this case the access opening of the stowage region is accessible from the front face of the base body and preferably from the accommodation region.

An "accommodation of the oral-hygiene means in a stowage position" is herein in particular to mean a fixation of the oral-hygiene means in a situation relative to the base body, in which situation at least a portion of the oral-hygiene means, advantageously at least the cleaning zone of the oral hygiene means, is—in a projection perpendicularly to the main extension direction of the base body—arranged within the base body. In particular, the stowage region is configured for a storage of the oral-hygiene means in the stowage position, wherein the main extension direction of the cleaning zone extends in parallel to the main extension direction of the base body. Advantageously the stowage region is configured for a storage of the oral-hygiene means in the stowage position, wherein the cleaning zone of the oral-hygiene means faces away from the front face of the base body.

An implementation of the oral hygiene handle device, for example as a one-component injection-molded part, which is advantageously combinable with an oral-hygiene means that is formed as a multi-component injection-molded part and may preferably be accommodated in the accommodation region and/or in the stowage region, in particular allows the mutually adapted elements, namely an oral hygiene handle device and an oral-hygiene means, favorably complementing each other regarding a handle functionality. It is, for example, possible to create an improved handle surface of the oral hygiene handle device, in particular as, for example, a soft component of the oral-hygiene means implements a portion of the surface of the oral hygiene handle device, which therefore has improved anti-slip characteristics, and/or as the holding positions, like a thumb grip or other finger supports, have improved ergonomic, comfort and/or anti-slip characteristics.

It is conceivable that the base body comprises at least one pictogram and/or at least one lettering, in particular in the accommodation region and/or in the stowage region, advantageously at least roughly sketched instructions for an assembly and/or disassembly of an oral-hygiene means in the accommodation region in the application position and/or in the stowage region in the stowage position. Preferably the pictogram and/or the lettering are/is configured to be covered, in the application position and/or in the stowage position, at least partly, advantageously at least to a large extent, by the oral-hygiene means, particularly advantageously by the oral-hygiene means base body.

If the oral-hygiene means comprises at least one protective cap, it is conceivable that the base body comprises at least one protective-cap stowage region, which is advantageously arranged on a side of the base body facing away from the front face of the base body, and which is configured for an accommodation of the protective cap. Advantageously a protective cap is stowable, in particular while the oral-hygiene means is held in an application position and/or in a stowage position. In an advantageous implementation of the invention it is proposed that the accommodation region implements the stowage region at least partly. Advantageously the accommodation region and the stowage region are connected in a one-part implementation. "In a one-part implementation" is in particular to mean formed in one piece. Preferably this one piece is produced from a single blank, from one mass and/or one cast, particularly preferably in an injection-molding process, in particular a one-component and/or multi-component injection-molding process. Preferentially the accommodation region forms at least one first partial region of the stowage region, which is configured, at least in the stowage position, to accommodate the oral-hygiene means base body of the oral-hygiene means at least partially, advantageously at least to a large extent. Especially preferably the stowage region comprises at least one second partial region, which is configured to accommodate the cleaning zone of the oral-hygiene means at least partially, advantageously to a large extent. Viewed perpendicularly to the main extension direction of the base body, the first partial region is advantageously arranged beside the second partial region. Advantageously the first partial region and the second partial region implement the stowage region. In particular, the accommodation region and the stowage region are together embodied as a recess of the base body, which is in particular arranged on an underside of the base body. It is herein conceivable that the base body comprises at least one cover, which is in particular arranged in a foldable manner, e.g. fixated by means of a hinge, preferably a film hinge, and/or is pliable and/or is connected in a latching manner and/or is captively fixated and/or is slidable, said cover covering at least a portion of the stowage region and/or at least a portion of the accommodation region, in particular towards an outer face, advantageously towards the underside of the base body. This advantageously allows achieving a structural simplicity and/or intuitive manageability. Advantageously it is thus possible that a common region accommodates an oral-hygiene means in different positions.

It is however also conceivable that at least the second partial region of the stowage region is embodied as a blind hole, whose opening in particular extends substantially parallel to the main extension direction of the base body. In particular, it is conceivable that the accommodation region and the stowage region are together implemented as a blind hole, whose opening extends in particular perpendicularly to the main extension direction of the base body, and advantageously on the front face of the base body. In this case, viewed from the front face of the base body, in particular along the main extension direction of the base body, the stowage region is preferentially arranged behind the accommodation region. Especially advantageously, in this case a cross section of the accommodation region and/or a cross section of an access opening towards the accommodation region are/is at least partly adapted to a cross section of the oral-hygiene means base body. It is furthermore in particular conceivable that the base body comprises at least one channel, which connects the stowage region to an outer face of the base body, in particular with a rear side of the base body that is situated opposite the front face, advantageously for the purpose of ensuring reliable drying of the oral-hygiene means. Preferably the channel has a diameter between 0.5 mm and 3 mm.

Preferentially, for an inlaying of the oral-hygiene means into the accommodation region and/or into the stowage region, the oral-hygiene means is guided through the respective access opening, is in particular then displaced along the main extension direction of the base body, and is advantageously latched in. In particular in case the accommodation region and/or the stowage region are/is, advantageously together, embodied at least partly as a blind hole, the accommodation region and/or the stowage region are/is configured to allow inlaying of the oral-hygiene means via a displacement along the main extension direction of the base body.

In a particularly advantageous implementation of the invention it is proposed that the stowage region has, on a side facing away from the accommodation region, a smaller cross section than the accommodation region. Preferably the second partial region of the stowage region has a smaller cross section than the accommodation region. Advantageously the stowage region has a tapering cross section along the main extension direction of the base body, in particular starting from a side of the stowage region that is oriented towards the front face of the base body. Especially advantageously the cross section of the stowage region is adapted to a cross section of the cleaning zone of the oral-hygiene means, in particular at least in the second partial region of the stowage region. This advantageously allows achieving a secure and/or contamination-protected stowage of the oral-hygiene means. Furthermore, in this way a faulty inlaying of the oral-hygiene means by a user may be avoided and/or an intuitive manageability may be achieved.

In a further implementation of the invention it is proposed that the stowage region is configured for a contact-free support of the cleaning zone of the oral-hygiene means. In particular, the stowage region is configured for holding the oral-hygiene means on the oral-hygiene means base body. Advantageously, in the stowage position a minimum distance between the cleaning zone, in particular the cleaning element, and the base body is at least 0.1 mm. Advantageously, in the stowage position a minimum distance between the cleaning zone, in particular the cleaning element, and the base body is maximally 1 mm, especially advantageously maximally 0.5 mm. In this way reliable drying of the oral-hygiene means, in particular subsequently to an application, and/or an advantageously high hygiene level are/is achievable. Furthermore, a bending and/or damaging of the oral-hygiene means in the stowage position is advantageously avoidable.

It is moreover proposed to implement, in the second partial region of the stowage region, in which the cleaning zone is situated in the stowed state, small pass-through holes through the base body of the oral hygiene handle device, which in particular allow better drying of the cleaning zone subsequently to an application.

Beyond this it is proposed that the stowage region comprises a shell surface, which encompasses the cleaning zone of the oral-hygiene means, in at least one section plane that is perpendicular to a main extension direction of the base body, over an angle range of more than 180°. There are in particular at least two straight lines, in a plane that is perpendicular to a central axis of the shell surface, which intersect with the central axis and include an angle of more than 180°. By a "central axis" of an object is herein in particular an imaginary axis to be understood which extends within the object, in parallel to a main extension direction of the object, and intersects with the object on maximally two sides. In particular, the second partial region of the stowage region comprises the shell surface. In particular, the shell surface extends, in a projection along the central axis of the stowage region, at least in a large portion of all directions, starting from the central axis of the stowage region, farther than the cleaning zone of the oral-hygiene means when the oral-hygiene means is arranged in the stowage position. In this way a stowed oral-hygiene means may advantageously be protected from contamination. This moreover allows avoiding a contact of a cleaning zone when depositing the oral hygiene handle device.

In a preferred implementation of the invention it is proposed that the accommodation region comprises at least one fixation element, which is configured for an at least partial fixation of the oral-hygiene means in the application position and in the stowage position. In particular, the fixation element may be embodied cylinder-shaped and/or truncated-cone-shaped and/or truncated-pyramid-shaped and/or elongate and/or stripe-like and/or comb-shaped and/or rectangular-cuboid-shaped and/or spherical-segment-shaped and/or rotary-body-segment-shaped. Advantageously the fixation element is configured for a latch connection and/or clamp connection with the oral-hygiene means. Especially advantageously the fixation element is configured to fixate and/or contact the oral-hygiene means in the application position in a different region than in the stowage position. Preferably the fixation element is configured to at least partially push the oral-hygiene means, in the application position and/or in the stowage position, against a shell surface of the accommodation region and/or of the stowage region. Preferentially the fixation element is connected to the accommodation region and/or to the stowage region in a one-part implementation. The fixation element advantageously comprises at least one hard component. In particular the fixation element is advantageously harder and/or less elastic than a region of the oral-hygiene means that is configured for a fixation by the fixation element. For example, the fixation element is embodied of a hard component, and in particular the corresponding counterpart on the oral-hygiene means is embodied of a soft component. It is however also conceivable that the fixation element comprises at least one soft component. In this case it is further conceivable that the fixation element is softer and/or more elastic than a region of the oral-hygiene means that is configured for a fixation by the fixation element. In this way advantageously a diversity of components may be reduced and/or a simple manufacturing may be facilitated. A compensation for manufacturing tolerances may be created. Moreover, in this way a secure fixation of the oral-hygiene means on the oral hygiene handle device may be facilitated.

In a particularly preferred implementation of the invention it is proposed that the fixation element is embodied as an elevation extending along at least one direction over maximally 10%, advantageously over no more than 7% and particularly advantageously over no more than 5% of an extension of the base body along the direction. The fixation element advantageously has, in particular along the main extension direction of the base body, a length of at least 0.2 mm and advantageously of no less than 0.5 mm, and/or a length of maximally 6 mm and advantageously of no more than 5 mm. A height of the fixation element is, starting from the shell surface of the accommodation region, at least 0.2 mm, preferentially at least 0.3 mm, and/or maximally 1 mm, preferentially no more than 0.6 mm. Particularly advantageously the oral hygiene handle device comprises fixation elements with at least two different dimensionings. It is also conceivable that all fixation elements of the oral hygiene handle device are embodied at least substantially identically. By "at least substantially identical" objects are in particular, in this context, objects to be understood which are structured in such a way that they are respectively capable of fulfilling a shared functionality, and that, except for manufacturing tolerances, they differ structurally at most by respective elements which are not relevant for the shared functionality. Preferably the fixation element is embodied as a latch nub. Preferentially the oral hygiene handle device comprises a plurality of fixation elements, which are configured for a fixation of the oral-hygiene means in the application position and/or in the stowage position, and which are in particular arranged along the main extension direction of the base body in such a way that they are spaced apart by at least 10 mm and advantageously by no less than 20 mm, and/or spaced apart by maximally 40 mm and advantageously by no more than 30 mm. The fixation elements are advantageously arranged in at least one group, wherein fixation elements of a group are in particular respectively arranged in a plane that is perpendicular to a main extension direction of the accommodation region and/or of the stowage region. Preferably a group of fixation elements comprises respectively two fixation elements, which are in particular arranged on a side of the accommodation region facing towards the underside of the base body. Particularly preferably the accommodation region and/or the stowage region are/is configured to clamp the oral-hygiene means, in the application position and/or in the stowage position, between the latch nubs of a group and the shell surface of the accommodation region and/or of the stowage region. It is however also conceivable that a group of fixation elements comprises respectively three fixation elements. A group of fixation elements is in this case configured to alone fixate the oral-hygiene means, at least in a region, in particular contact-free relative to the shell surface of the accommodation region and/or of the stowage region. Furthermore, in this case advantageously at least two fixation elements of the group of fixation elements is arranged on a side of the accommodation region that faces towards the underside of the base body. Moreover, in this case advantageously at least one fixation element of the group of fixation elements is arranged on a side of the accommodation region that faces away from the underside of the base body. Preferably the accommodation region comprises in this case at least two groups of fixation elements. It is further conceivable that the accommodation region comprises a plurality of fixation elements, wherein respectively maximally two of these are arranged in a shared plane that is perpendicular to the main extension direction of the accommodation region. Advantageously an arrangement of fixation elements features at least one mirror symmetry. Preferentially the positions of the fixation elements define fixation points, which have a fixed position relative to one another and to which a geometry of oral-hygiene means, in particular of oral-hygiene means base bodies, is adaptable, thus allowing a fixation of the respective oral-hygiene means, in particular at least section-wise, advantageously at least to a major part and preferably entirely contact-free relative to a shell surface of the accommodation region and/or of the stowage region. Especially advantageously the fixation elements fixate the oral-hygiene means in a region of the oral-hygiene means base body. Advantageously the oral-hygiene means has at least one cross section that is configured for a clamping and/or fixation between fixation elements and/or between fixation elements and the shell surface of the accommodation region and/or of the stowage region, said cross section having an extension that is, by at least 0.01 mm and particularly advantageously by at least 0.05 mm, and/or by maximally 0.5 mm and especially advantageously by no more than 0.2 mm, greater than an extension of a cross section that is defined by the corresponding fixation members and/or by the corresponding fixation members and the shell surface of the accommodation region and/or of the stowage region. This allows in particular providing an advantageous holding geometry for an oral-hygiene means. In this way it is moreover possible to provide a universal holding geometry for oral-hygiene means with different dimensions.

In an advantageous implementation of the invention it is proposed that the base body comprises at least one gripping zone which, in a projection perpendicularly to a main extension direction of the accommodation region, at least partially overlies the accommodation region. The gripping zone is preferably configured to be arranged opposite a handle element of the oral-hygiene means in at least one application position. Particularly preferably the gripping zone is implemented as a surface and/or differently from a recess. Advantageously the gripping zone comprises at least one surface structure that differs from a surface structure of at least one other region of the base body. Especially advantageously the gripping zone features a nubbed and/or cannelated and/or textured surface. The gripping zone may furthermore comprise at least one soft component. In particular, the gripping zone has an area content of at least 0.5 $cm^2$, advantageously at least 1 $cm^2$ and particularly advantageously no less than 1.5 $cm^2$, and/or an area content of maximally 5 $cm^2$, advantageously no more than 4 $cm^2$ and particularly advantageously no more than 3 $cm^2$. Advantageously a main extension plane of the gripping zone is arranged at least substantially parallel to the main extension direction of the base body. By a "main extension plane" of an object is in particular a plane to be understood which is parallel to a largest side surface of a smallest imaginary rectangular cuboid just still entirely enclosing the object, and which in particular extends through the center point of the rectangular cuboid. Preferably a surface of the gripping zone implements at least a portion of a surface of the base body. Especially advantageously the gripping zone is connected to the base body in a one-part implementation. This advantageously allows achieving a high level of operative comfort and/or improved manageability. It is moreover possible to facilitate a secure and/or controlled holding and/or guidance of the oral hygiene handle device.

Besides the gripping zone, the soft component may implement additional care and/or cleaning elements, respectively care and/or cleaning zones. Additional care and/or cleaning elements in or around the accommodation region of the oral hygiene handle device may cooperate with the exchangeable oral-hygiene means. The additional care and/or cleaning elements may be made of hard and/or soft materials. The additional care and/or cleaning elements may have very different shapes, e.g. lamellae and/or cylinders and/or nubs.

In an especially advantageous implementation of the invention it is proposed that the gripping zone is arranged on the upper side of the base body opposite the accommodation region. Advantageously, viewed perpendicularly to a main extension direction of the base body, the gripping zone is arranged beside the accommodation region. Particularly advantageously a rear side of the gripping zone implements the accommodation region and/or the stowage region at least partially. Advantageously a system with the oral hygiene handle device and the oral-hygiene means is in the application state configured to be held at least by the gripping zone of the base body and by the handle element of the oral-hygiene means if the oral-hygiene means is implemented differently from an exchangeable part and/or comprises a handle element. Preferably a distance between the gripping zone of the base body and the cleaning zone of the oral-hygiene means is less than 50 mm, preferably less than 40 mm and particularly preferably less than 30 mm. This advantageously allows achieving an intuitive manageability and/or direct guidance and/or secure holding of an oral-hygiene means. Moreover, a distance between a gripping zone and a cleaning zone is advantageously reducible, as a result of which in particular an improved force transmission and/or improved characteristics regarding precise handling are/is achievable.

It is further proposed that the base body comprises at least one access opening, which is arranged on an upper side of the base body, opposite the accommodation region, and through which the accommodation region is at least partially accessible. Preferentially the access opening has an at least substantially elliptic cross section or an at least substantially circle-shaped or a polygonal cross section. Preferably the access opening is arranged in a region of the accommodation region that is configured for an accommodation of the oral-hygiene means base body in the application position and/or in the stowage position, such that, in particular for a demounting of the oral-hygiene means, the oral-hygiene means may be pushed, through the access opening, at least partly out of the accommodation region. In particular the access opening has a length of at least 5 mm, advantageously of at least 7 mm and especially advantageously of at least 11 mm, and/or a length of maximally 20 mm, advantageously of no more than 15 mm and especially advantageously of no more than 13 mm. In particular the access opening has a width of at least 3 mm, advantageously of no less than 5 mm and especially advantageously of at least 7 mm, and/or a width of maximally 15 mm, advantageously of no more than 10 mm and particularly advantageously of maximally 9 mm. Preferentially a width of the access opening corresponds at least substantially to a width of the accommodation region in a point in which the accommodation region is at least partly accessible through the access opening. Advantageously, in a projection perpendicularly to the main extension direction of the base body, the access opening is arranged at least partly, particularly advantageously at least to a large extent, arranged beside the gripping zone, in particular on a side of the gripping zone that faces away from the front face of the base body. In this way advantageously a high level of operative comfort is achievable, in particular in a fixation of the oral-hygiene means on the oral hygiene handle device and/or in a release of the oral-hygiene means from the oral hygiene handle device.

Beyond this it is proposed that the base body comprises at least one handle region which is, in a projection perpendicularly to a main extension direction of the accommodation region, arranged at least partly beside the accommodation region, and advantageously side by side with the stowage region. Preferably the handle region is arranged on an underside of the base body. Especially advantageously the handle region is arranged on a side of the access opening that faces away from the gripping zone. Advantageously the handle region comprises at least one surface structure differing from a surface structure of at least one other region of the base body. Particularly advantageously the handle region has a nubbed and/or cannellated and/or textured surface. The handle region may furthermore comprise at least one soft component. In particular, a main extension direction of the handle region extends at least substantially parallel to the main extension direction of the base body. Preferably the handle region has a length of at least 10 mm, preferably of at least 20 mm and particularly preferably of no less than 30 mm, and/or a length of maximally 150 mm, preferably of no more than 100 mm and particularly preferably of maximally 70 mm. Especially preferentially the handle region has a width corresponding at least largely to a width of the base body. This in particular allows achieving improved characteristics regarding handling and/or holding. Moreover, in this way a high level of comfort is achievable, in particular in case of a one-handed usage.

In an advantageous implementation of the invention it is proposed that the accommodation region is configured for an accommodation of the oral-hygiene means in a further application position that differs from the application position. The further application position preferably differs from the application position at least regarding a situation of the oral-hygiene means relative to the base body. In particular, an oral-hygiene means may in the further application position be configured for a different application than in the application position. This advantageously allows achieving a high degree of variability. It is furthermore possible to advantageously enlarge a range of usages.

In a particularly advantageous implementation of the invention it is proposed that the accommodation region is configured, in the further application position, to support a cleaning zone of the oral-hygiene means at an angle relative to a main extension direction of the base body that differs from such an angle in the application position, in particular an angle of at least 10°, advantageously at least 20° and especially advantageously no less than 30°, and/or at an angle of maximally 90°, advantageously no more than 70° and especially advantageously maximally 60°. This in particular allows achieving advantageous characteristics regarding a comfortable and/or thorough and/or controlled usage.

In a preferred implementation of the invention it is proposed that the accommodation region is configured to support the oral-hygiene means in the further application position in a different location along a main extension direction of the base body than in the application position, in particular in a location that is closer to a front face of the base body. Advantageously a distance, along the main extension direction of the base body, between a location of the oral-hygiene means in the application position and a location of the oral-hygiene means in the further application position is at least 1 mm, advantageously no less than 2 mm and especially advantageously no less than 3 mm, and/or maximally 20 mm, advantageously no more than 10 mm and especially advantageously no more than 7 mm. Especially advantageously the oral-hygiene means base body is in the further application position arranged at least partly, preferably at least to a large portion, within the accommodation region. Preferentially a distance between the cleaning zone of the oral-hygiene means and the base body in the further application position differs from a distance between the cleaning zone of the oral-hygiene means and the base body in the application position in particular by at least 1 mm, advantageously by at least 2 mm and particularly advantageously by at least 3 mm. This advantageously allows adapting geometries for different applications.

In a particularly preferred implementation of the invention it is proposed that the accommodation region comprises at least one fixation element, in particular at least one further fixation element, which is configured for an at least partial fixation of the oral-hygiene means in the application position and in the further application position. In particular, the fixation element may have at least one of the characteristics of the fixation element described above. This advantageously allows achieving a structural simplicity and/or an intuitive manageability.

Beyond this it is proposed that the base body comprises at least one oral-hygiene means pass-through, which is in particular implemented differently than the access opening and through which the oral-hygiene means at least partly extends in the further application position. Viewed from a front face of the base body, the oral-hygiene means pass-through is advantageously arranged before the gripping zone and/or before the access opening and/or before the handle region. In particular, the oral-hygiene means pass-through has a length of at least 3 mm, advantageously of at least 5 mm and particularly advantageously of no less than 6 mm, and/or a length of maximally 15 mm, advantageously of no more than 10 mm and particularly advantageously of no more than 8 mm. Advantageously the length of the oral-hygiene means pass-through is greater than a height of the oral-hygiene means base body by at least 0.5 mm, especially advantageously by at least 1 mm. Particularly advantageously the length of the oral-hygiene means pass-through extends at least substantially parallel to the main extension direction of the base body. In particular, the oral-hygiene means pass-through has a width of at least 5 mm, advantageously of no less than 6 mm and particularly advantageously of no less than 7 mm, and/or a width of maximally 15 mm, advantageously of no more than 10 mm and particularly advantageously of maximally 9 mm. Advantageously a width of the oral-hygiene means pass-through at least substantially corresponds to a width of the oral-hygiene means base body. Preferentially in the further application position the cleaning zone of the oral-hygiene means and in particular at least a portion of the oral-hygiene means base body extend through the oral-hygiene means pass-through, advantageously from the accommodation region, especially advantageously towards the upper side of the base body. Particularly preferably the oral-hygiene means pass-through is configured to at least partly fixate the oral-hygiene means in the further application position. It is further conceivable that at least an edge of the oral-hygiene means pass-through at least partly fixates the oral-hygiene means in the application position, said edge being, for example, embodied flatly bracket-shaped. Herein the edge needs to be kept as slight as possible on the front face to prevent it from hampering in a usage. Advantageously a distance between a geometric center point of the oral-hygiene means pass-through and a geometric center point of the access opening is at least 15 mm, especially advantageously at least 25 mm and preferably at least 30 mm, and/or maximally 70 mm, especially advantageously no more than 50 mm and preferably no more than 40 mm, in particular along the main extension direction of the base body. Advantageously a distance between the geometric center point of the oral-hygiene means pass-through and the front face of the base body is at least 2 mm, especially advantageously no less than 3 mm and preferably at least 5 mm, and/or maximally 15 mm, particularly advantageously no more than 10 mm and preferably no more than 8 mm, in particular along the main extension direction of the base body. A correct mounting of the oral-hygiene means in the further application position preferably comprises passing through of at least one component, which is advantageously the cleaning zone of the oral-hygiene means, particularly preferably from the accommodation region, through the oral-hygiene means pass-through as well as, advantageously subsequently, pushing and/or inserting the oral-hygiene means base body into the accommodation region. In this way it is in particular possible to achieve advantageous characteristics regarding intuitive assembly of an oral-hygiene means in different application positions. Moreover, this advantageously allows a reliable fixation of the oral-hygiene means.

It is also proposed that the oral-hygiene means pass-through is arranged on the upper side of the base body, opposite the accommodation region. Particularly preferably the accommodation region is at least partially accessible through the oral-hygiene means pass-through, in particular from the upper side of the base body. Advantageously a rear side of an edge of the oral-hygiene means pass-through implements at least a portion of the accommodation region, in particular on a side of the accommodation region that faces away from the stowage region. This advantageously allows providing an opening for an easy demounting of an oral-hygiene means.

In a further implementation of the invention it is proposed that the accommodation region, advantageously the oral-hygiene means pass-through of the accommodation region, is configured to at least partly bend the oral-hygiene means in the further application position, preferably in a region of the oral-hygiene means base body. It is however also conceivable that the accommodation region is configured to at least partly bend the oral-hygiene means in the cleaning zone, in particular in a region of a fixation, e.g. a fastening wire, of a fastening element. Advantageously the accommodation region is configured to support a first region of the oral-hygiene means in parallel to the main extension direction and/or to at least partly bend a second region of the oral-hygiene means, which in particular at least partially comprises the cleaning zone of the oral-hygiene means, such that in the further application position in particular a main extension direction of the cleaning zone includes with the main extension direction of the base body a different angle than in the application position. In particular in a case when the oral-hygiene means is bent in a region of the cleaning zone, the angle may advantageously be between 10° and 75°. Preferentially a distance between a front end of the cleaning zone and a region in which the oral-hygiene means is bent in the further application position is maximally 50 mm, advantageously no more than 40 mm and especially advantageously maximally 30 mm. Advantageously a distance between the region in which the oral-hygiene means is bent and an end of the oral-hygiene means base body that faces away from the cleaning zone is at least 50%, particularly advantageously at least 60% and preferably at least 70% of a length of the oral-hygiene means base body. This allows achieving advantageous characteristics regarding a slim holding contour in a combination with a high degree of variability concerning an applicability.

A realization of an angle of the cleaning zone of the oral-hygiene means relative to the main extension direction of the base body is, for example, also achievable by other means. For example, additional parts may be provided in the oral hygiene handle device, which are movable and/or deformable and which in particular permit an angling of the oral-hygiene means. The realization of an angle is also possible by an implementation of the accommodation region in the manner of a pocketknife and/or jackknife. In particular, the accommodation region is herein attached to a rotatable element and/or is partly implemented by such a rotatable element, the rotatable element being rotatably connected with the base body. Options may thus be created for a realization of different angles and/or for a pivoting from an application position into a stowage position, and the like.

A further possibility of realizing different angles may be created in particular by an implementation of the interface between the oral-hygiene means and the oral hygiene handle device, wherein the interface is embodied as a rotary axis and advantageously the oral-hygiene means is thus supported in a rotatable, in particular exchangeable manner. A snapping and/or latching is in this case implemented directly on the rotary axis or in its proximity. The rotation may be effected between an application position and a stowage position. An orientation of the rotation relative to the oral hygiene handle device is not limited, and may be realized in any of different angles sideways and/or along a length. In particular, an orientation may be modifiable in accordance with a pivoting around one, two or three, in particular imaginary, pivot axis/axes, which are in particular arranged perpendicularly to one another.

The base body is advantageously implemented in such a way that it is producible and in particular demouldable in an injection-molding process, advantageously without core pullers. In particular, advantageously all the fixation elements are arranged in a region of the access opening and/or of the oral-hygiene means pass-through. It is conceivable that the accommodation region comprises at least one further access opening and/or at least one further oral-hygiene means pass-through with at least one of the features described above. It is further conceivable that the accommodation region comprises no fixation element or only two fixation elements, and is configured for a fixation of the oral-hygiene means also by means of the oral-hygiene means pass-through, in particular additionally in the application position. Moreover it is conceivable that the base body comprises at least one membrane, which is in particular embodied of a synthetic material, which comprises at least one soft component and which covers the access opening, in particular from the upper side of the base body, at least partly, preferably at least to a large extent. Advantageously the membrane is deformable towards the accommodation region in a damage-free or non-destructive manner, as a result of which in particular a demounting of an oral-hygiene means that is inlaid in the accommodation region and/or in the stowage region by exerting a pressure on the membrane is facilitated. The membrane is implemented of a soft material, preferentially together with other regions.

Beyond this it is conceivable that the accommodation region and/or the stowage region are/is configured to accommodate a plurality of, in particular identical, oral-hygiene means. The accommodation region and/or the stowage region may, for example, be configured to accommodate one oral-hygiene means in an application position and to accommodate a further, in particular identical oral-hygiene means in a stowage position. Preferably the accommodation region and/or the stowage region are/is in this case configured to support the oral-hygiene means one above the other one, viewed along a line that is perpendicular to the main extension direction of the base body. In particular, in this case accordingly a height and/or a width and/or a length of the base body may be greater than mentioned above. It is furthermore conceivable that the base body comprises a further accommodation region and/or a further stowage region, which are/is implemented separately from the accommodation region and/or the stowage region, in particular structurally identically to the accommodation region and/or the stowage region. For example, the base body may comprise an accommodation region and/or a stowage region on a front side, and an additional accommodation region and/or an additional stowage region on a rear side of the base body. It is in particular conceivable that the base body is embodied mirror-symmetrically to a plane which extends at least substantially perpendicularly to the main extension direction of the base body. It is however also conceivable that one side of the base body is configured for an accommodation and/or stowage of a first oral-hygiene means and a second side of the base body is configured for an accommodation and/or stowage of a second oral-hygiene means that is embodied differently from the first oral-hygiene means.

Moreover it is conceivable that the base body comprises at least one cover, which in a covering state at least partly covers the stowage region, in particular the second partial region of the stowage region. Preferably the cover is connected with the base body captively. Particularly preferably the cover is supported in a pivotable and/or rotatable and/or foldable and/or slidable fashion, and is, in particular subsequently to an inlaying of the oral-hygiene means in the stowage region, capable of being brought into a position that is situated before the cleaning zone, viewed from the underside of the base body.

Advantageous properties regarding a comfortable and/or secure and/or simple storage and/or application may in particular be achieved by a system with at least one oral hygiene handle device and with at least one oral-hygiene means. Advantageously a ratio of the lengths of the oral-hygiene means base body and of the base body is at least 1:5, particularly advantageously at least 1:4 and preferably no less than 1:3, and/or maximally 1:1, especially advantageously no more than 2:3 and preferably maximally 1:2.

Advantageous properties regarding a multi-fold applicability and/or reduced space requirements are achievable by a toothbrush with at least one bristle region and with at least one oral hygiene handle device according to the invention, whose accommodation region is arranged opposite the bristle region. In particular, the toothbrush comprises a toothbrush handle which is connected with a base body of the oral hygiene handle device in a one-part implementation. Advantageously the bristle region is arranged on a different side of the base body than the accommodation region of the oral hygiene handle device, in particular viewed perpendicularly to a main extension direction of the toothbrush handle.

The oral hygiene handle device is usually not sold without an oral-hygiene means. A sales unit usually comprises an oral hygiene handle device and an oral-hygiene means or a plurality of identical or differing oral-hygiene means. Differing oral-hygiene means may, for example, be interdental brushes with different diameters or with differing brush cuts, or interdental cleaners and flossers.

The sales unit may, for example, be a bag packaging and/or a blister packaging.

The oral-hygiene handle device according to the invention is herein not to be restricted to the application form and implementation described above. In particular, to fulfill a functionality herein described, the oral hygiene handle device according to the invention may comprise a number of respective elements, structural components and units that differs from a number that is mentioned here.

In the exemplary embodiments described in the following, there are several items of different structural units and/or structural components. For the sake of simplification, analogously implemented structural units and/or structural components, which are given the same reference numerals in the drawings, will be described only once in the following description of the drawings.

DRAWINGS

Further advantages will become apparent from the following description of the drawings. In the drawings seven exemplary embodiments of the invention are shown. The drawings, the description and the claims contain a plurality of features in combination. Someone skilled in the art will purposefully also consider the features separately and will find further expedient combinations.

Figure 2:
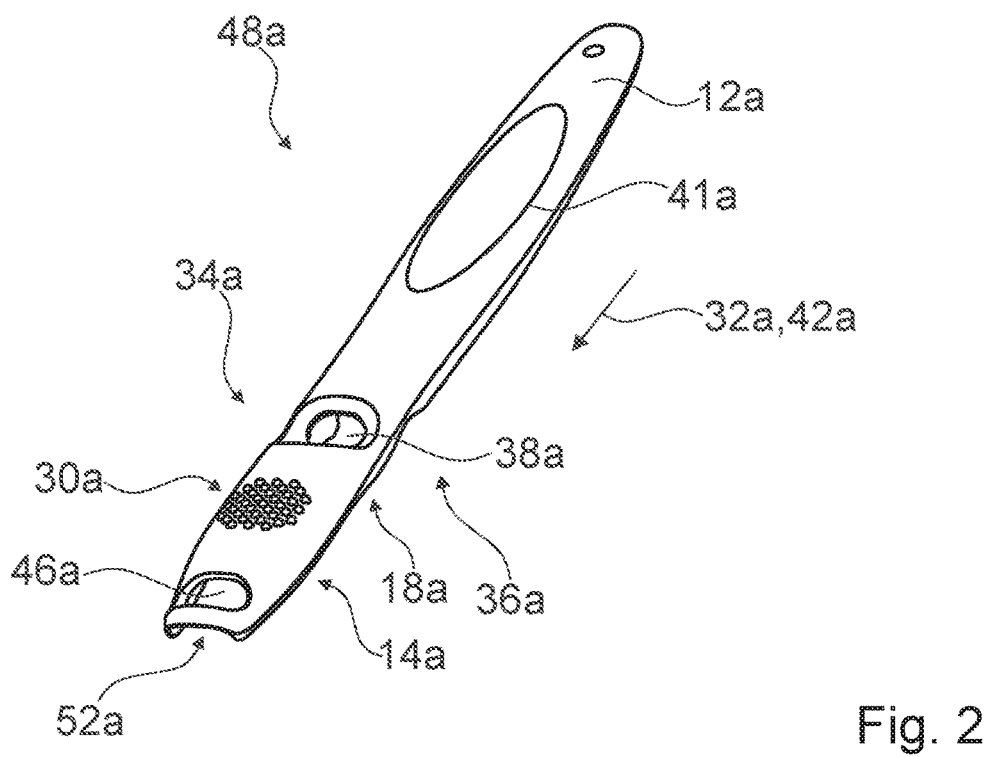
Figure 3:
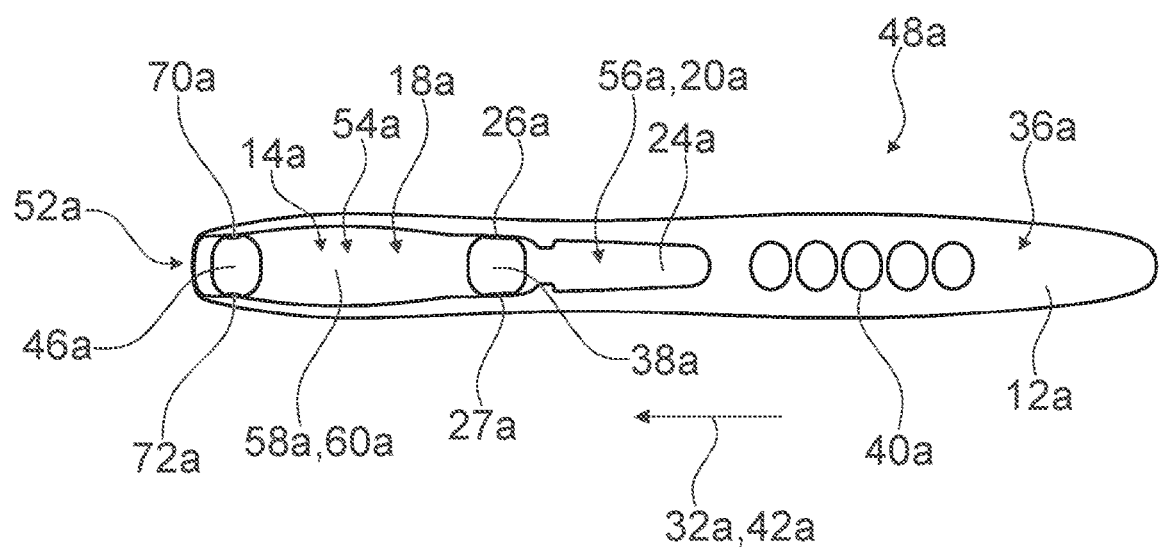
Figure 4:
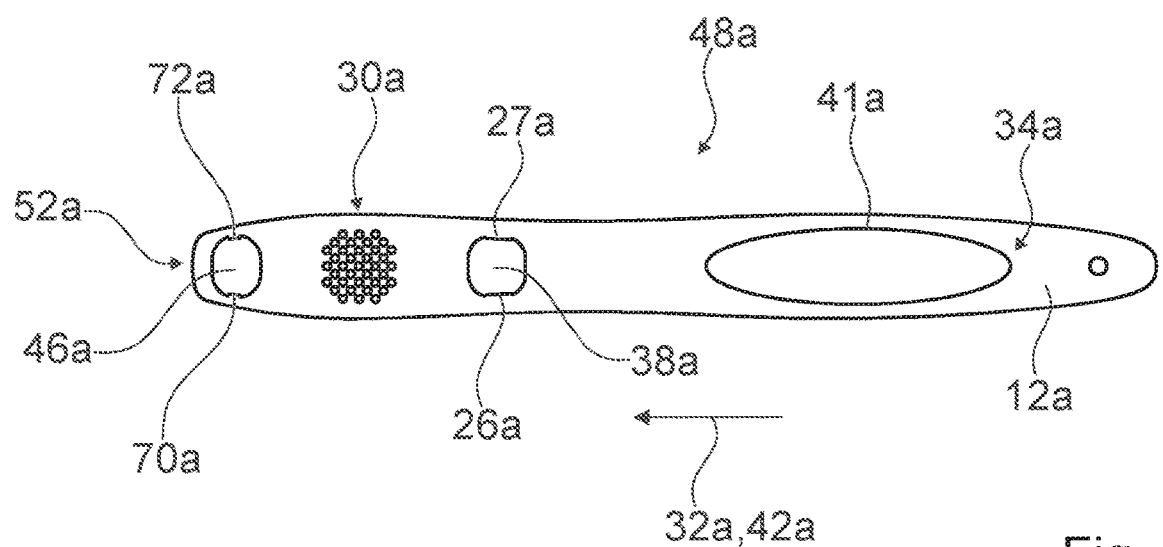
Figure 5:
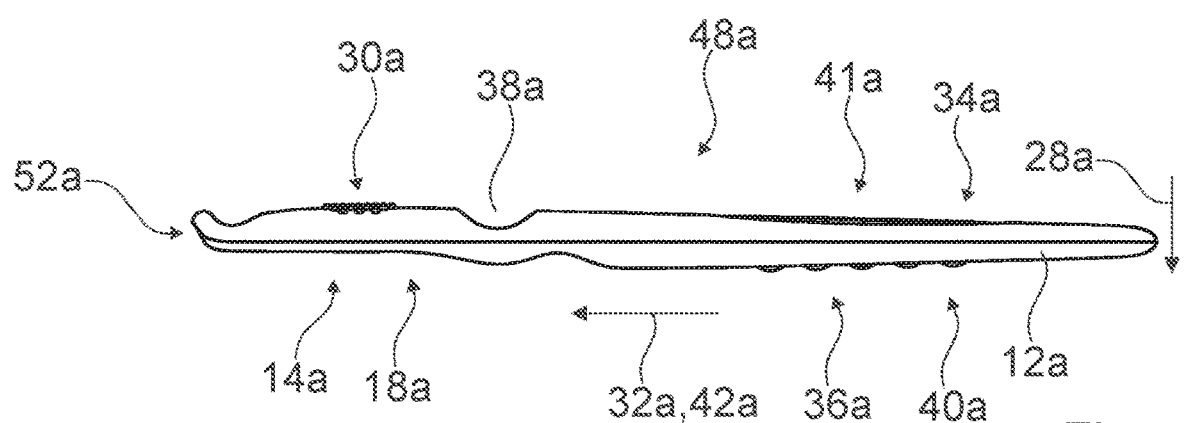
Figure 6:
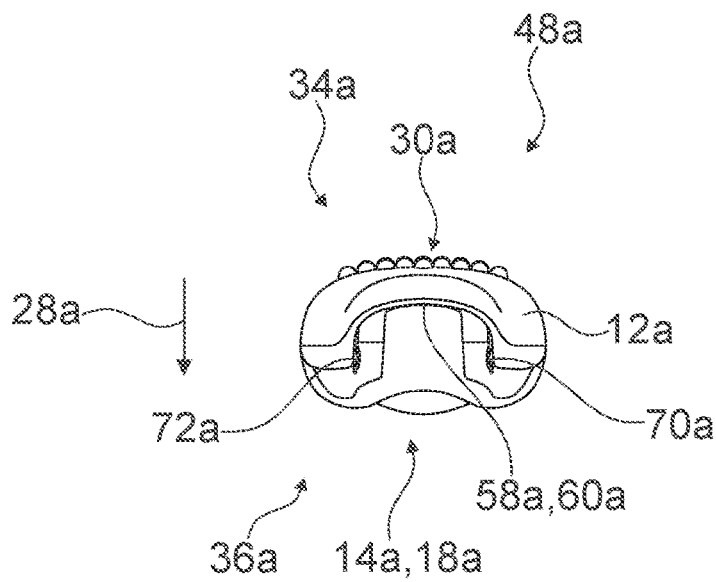
Figure 7:
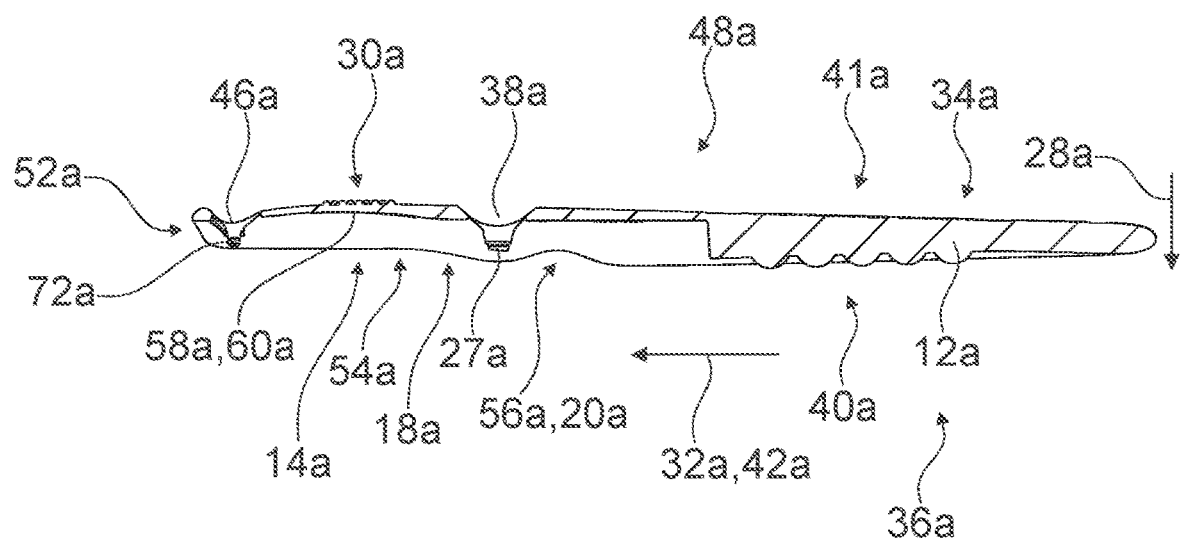
Figure 8:
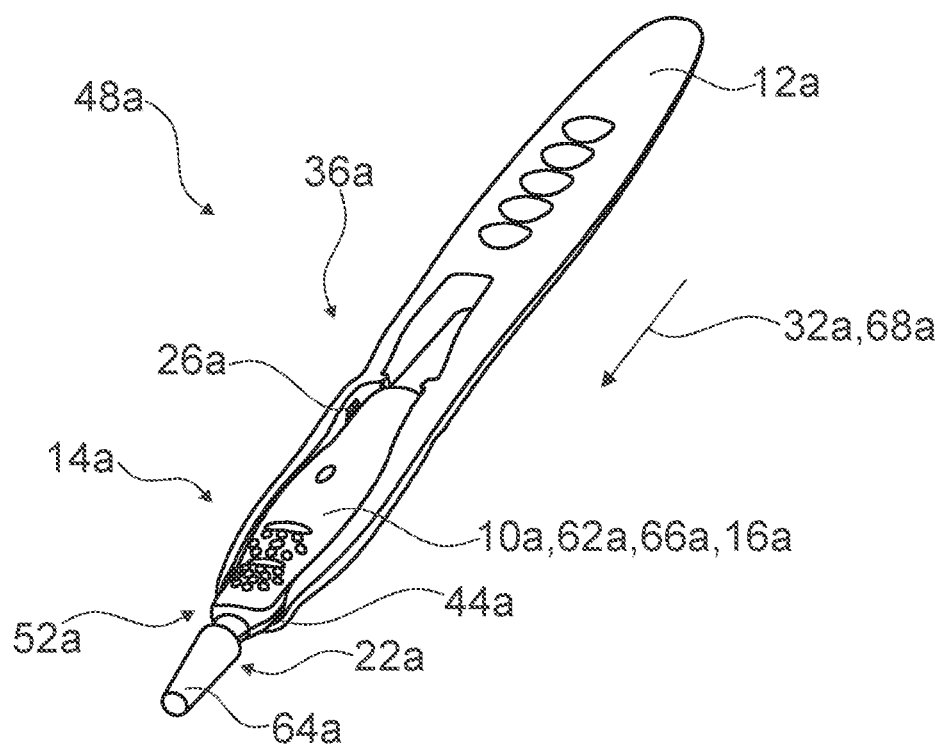
Figure 9:
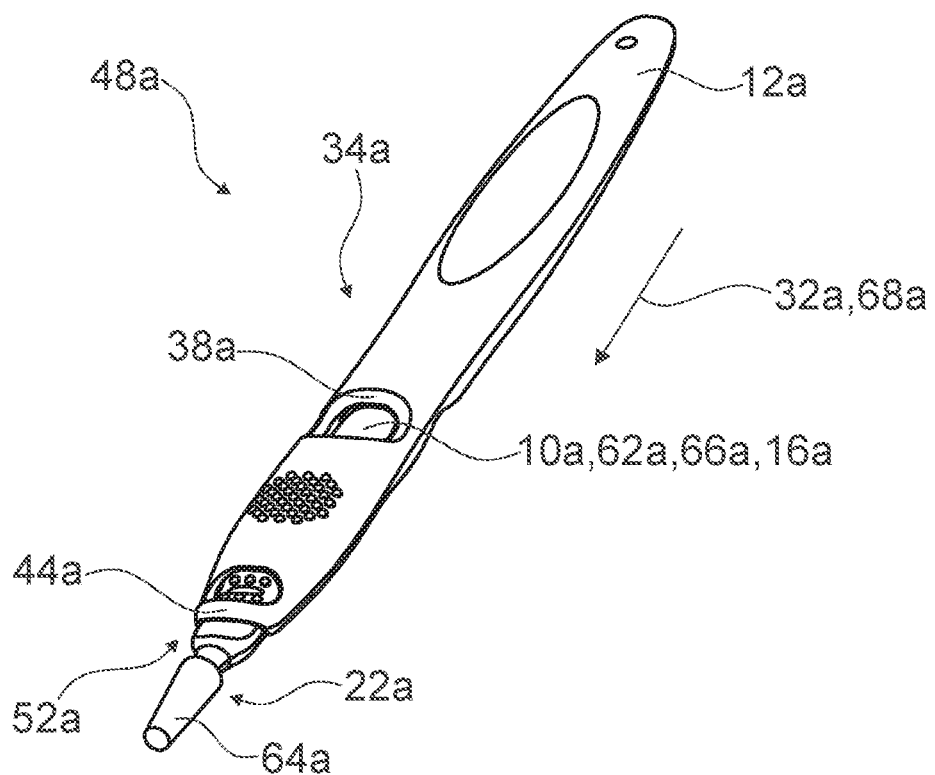
Figure 10:
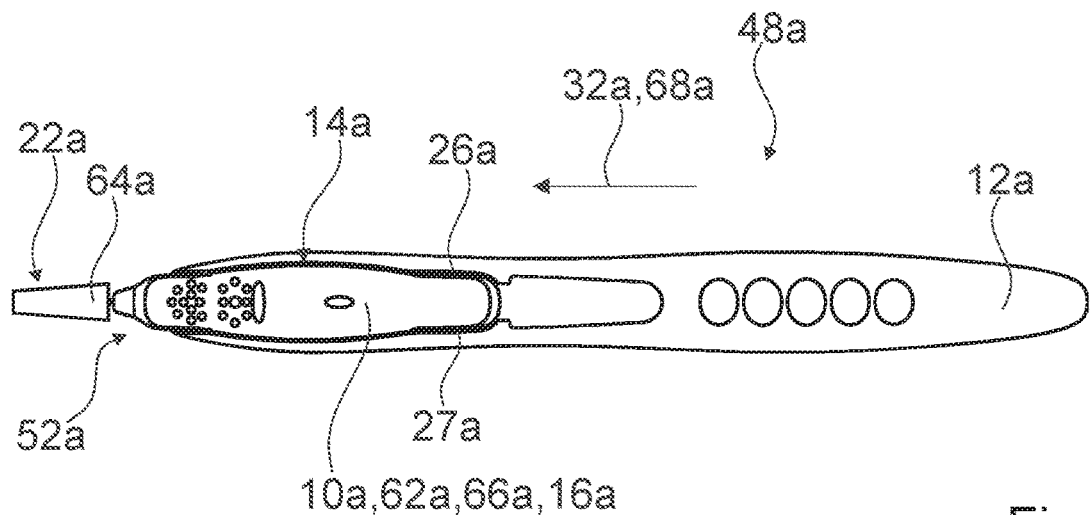
Figure 11:
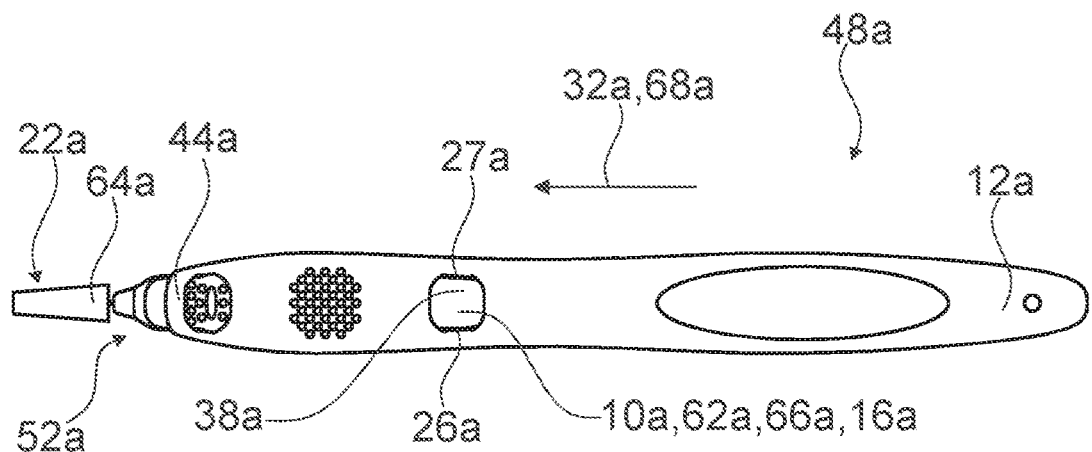
Figure 12:
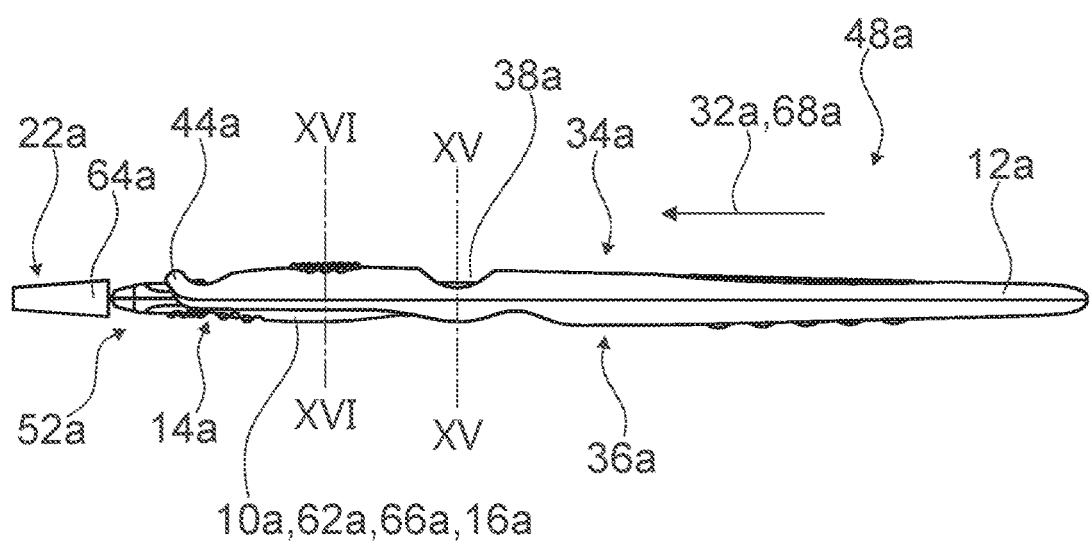
Figure 13:
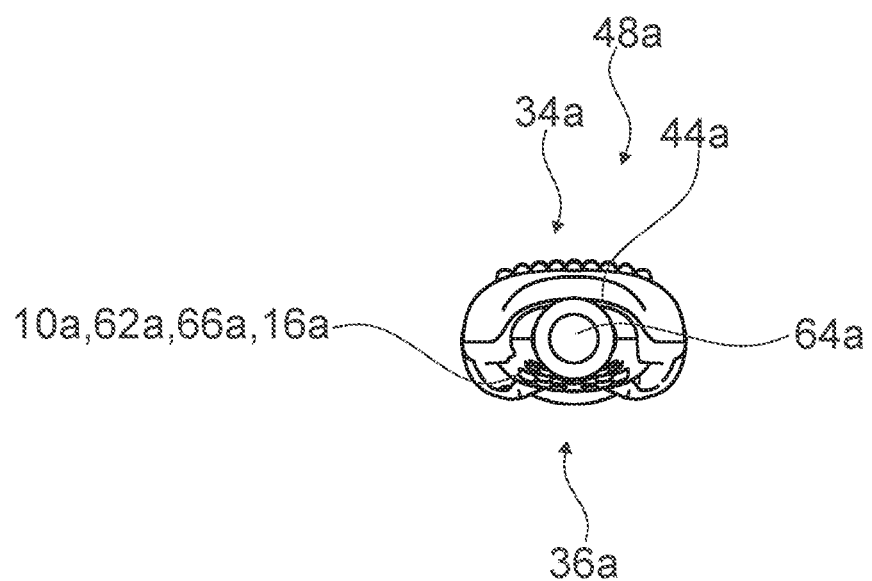
Figure 14:
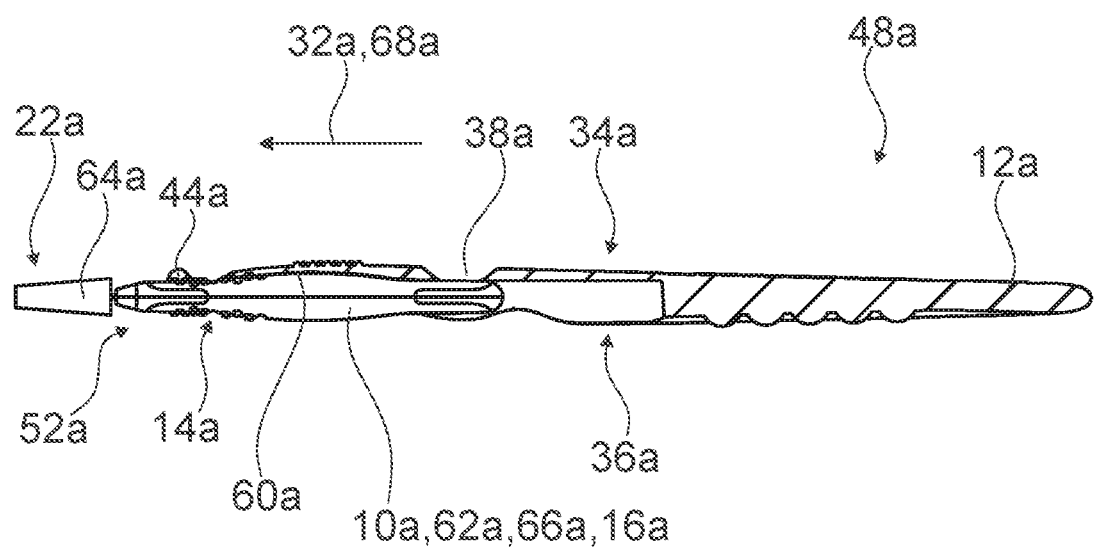
Figure 15:
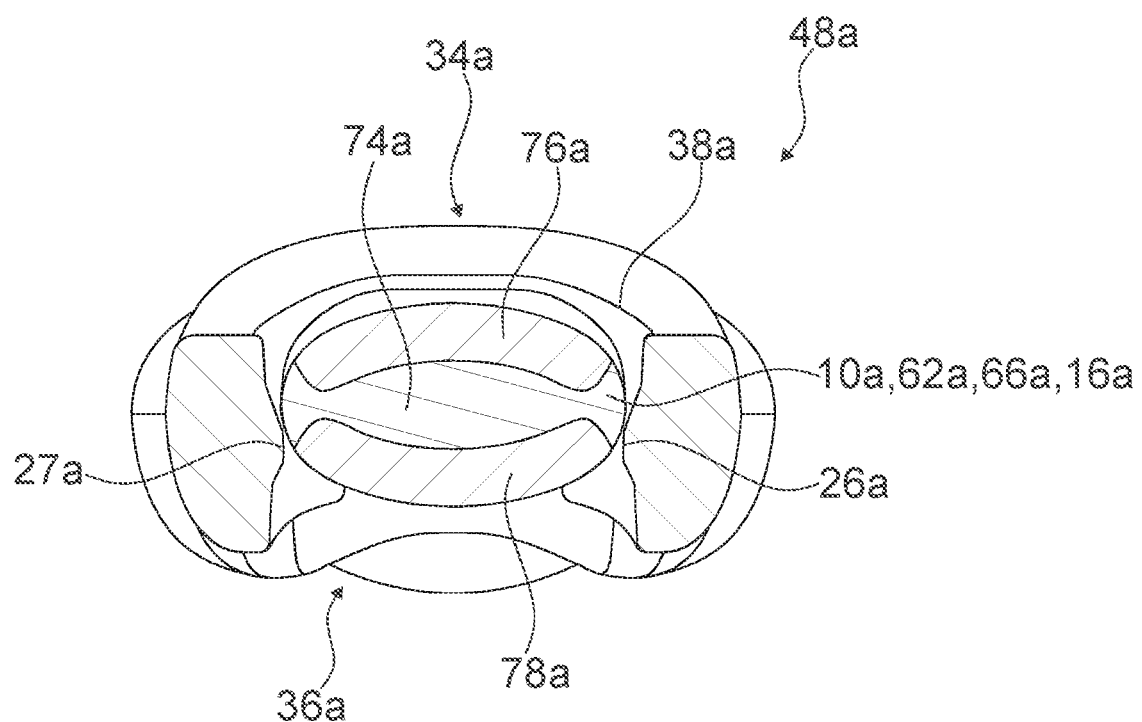
Figure 16:
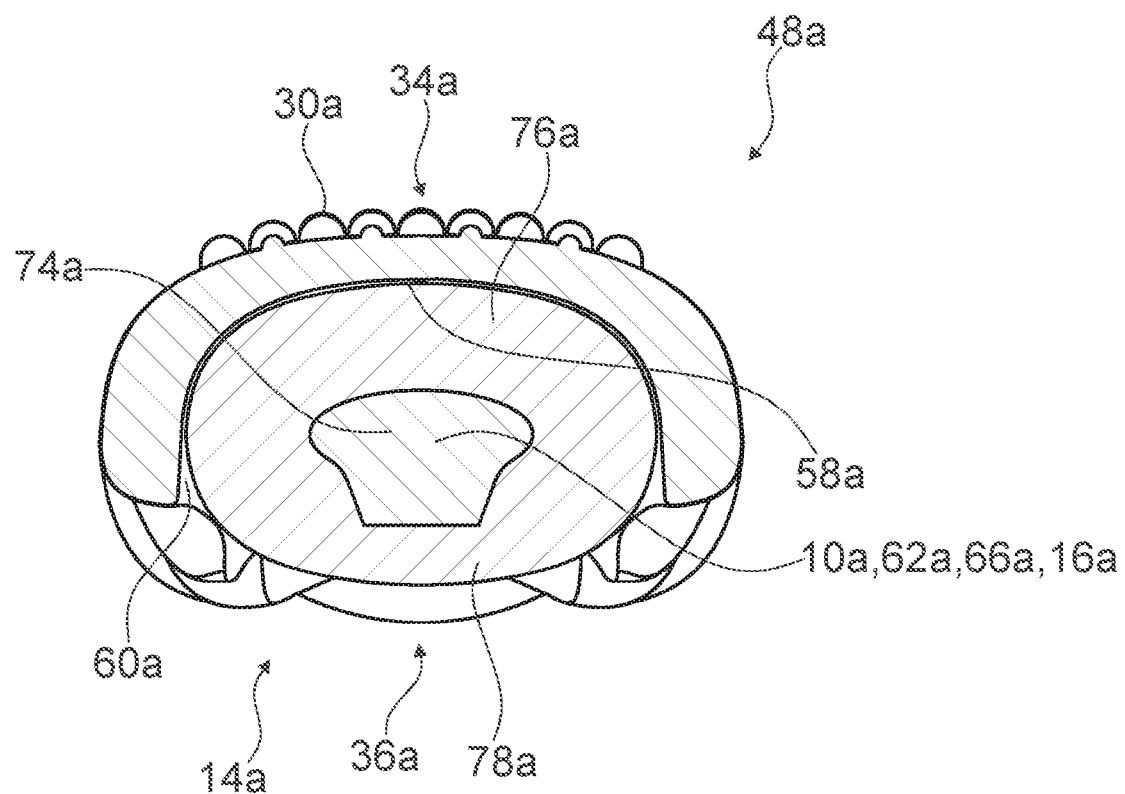
Figure 17:
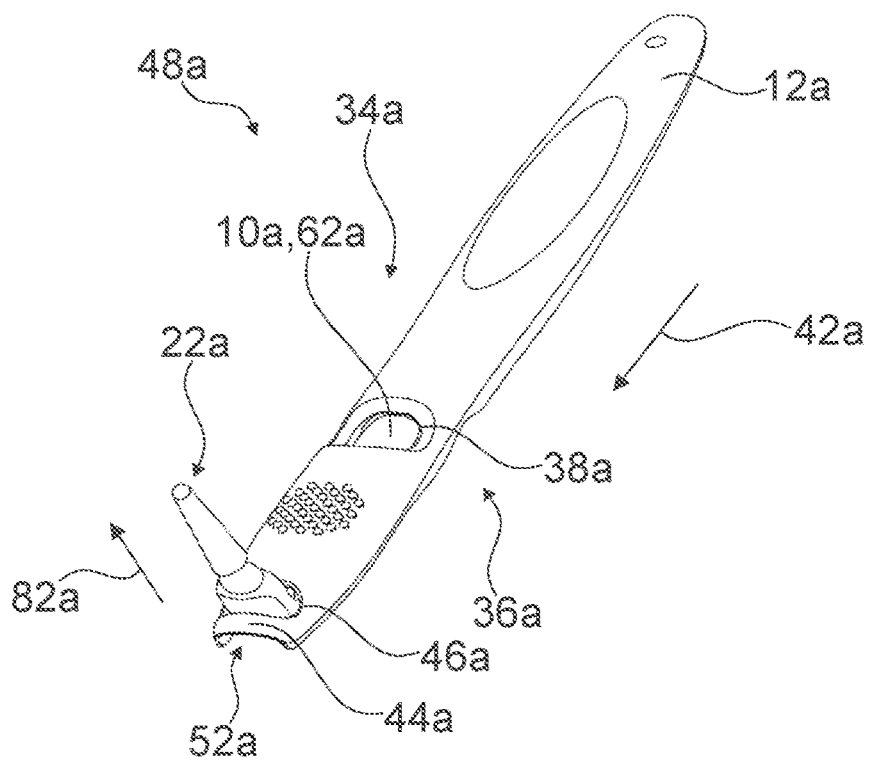
Figure 18:
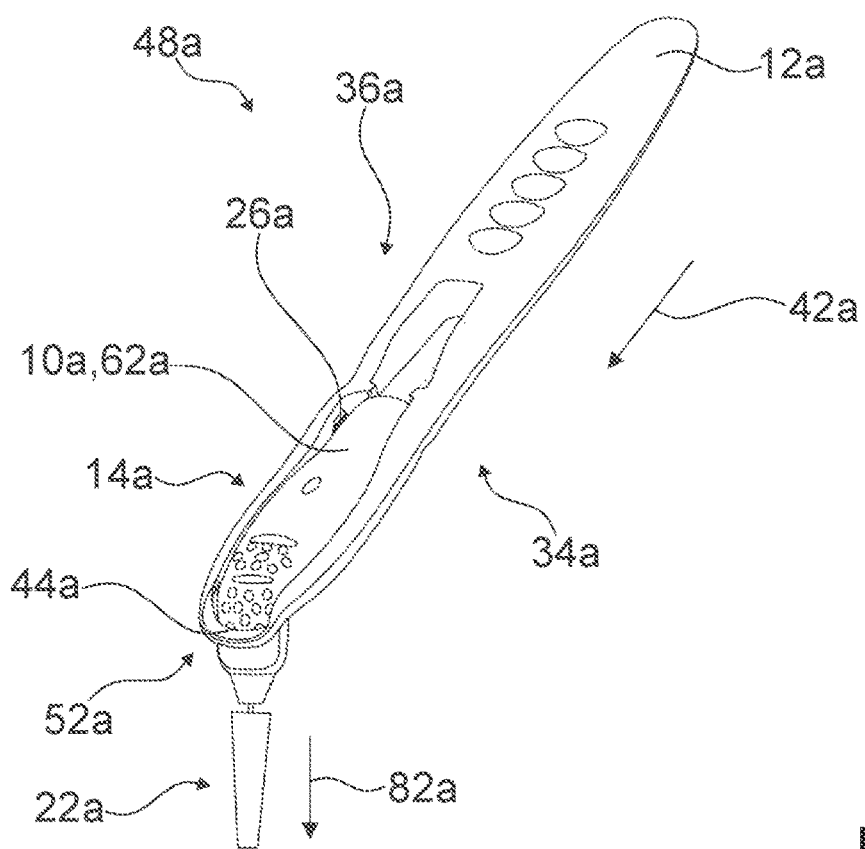
Figure 19:
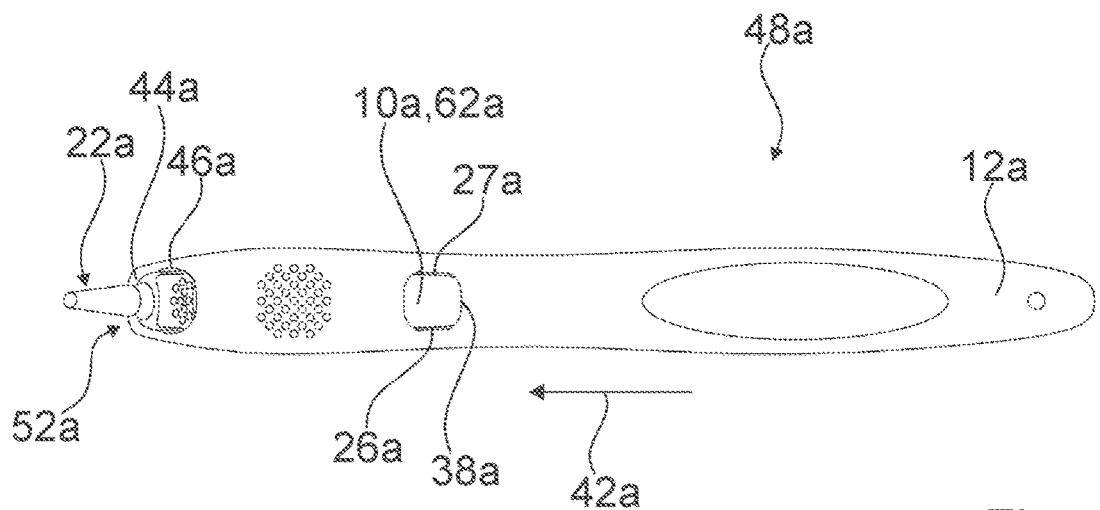
Figure 20:
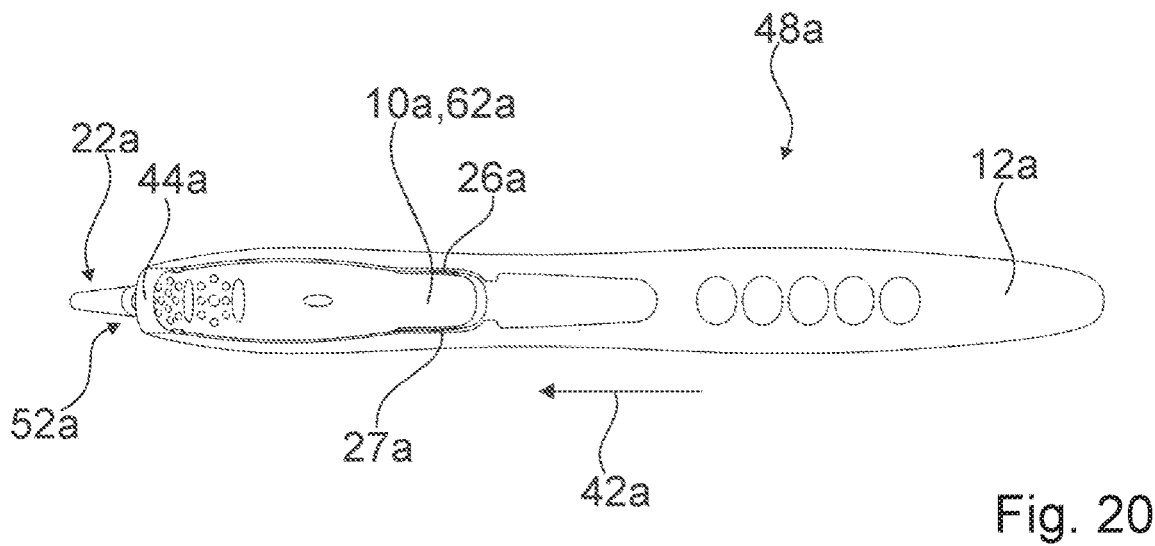
Figure 21:
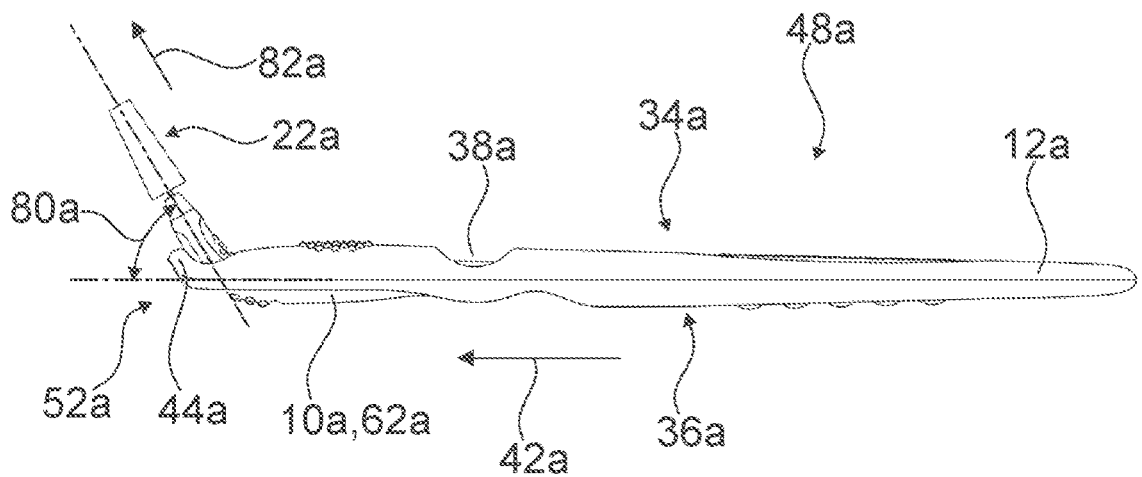
Figure 22:
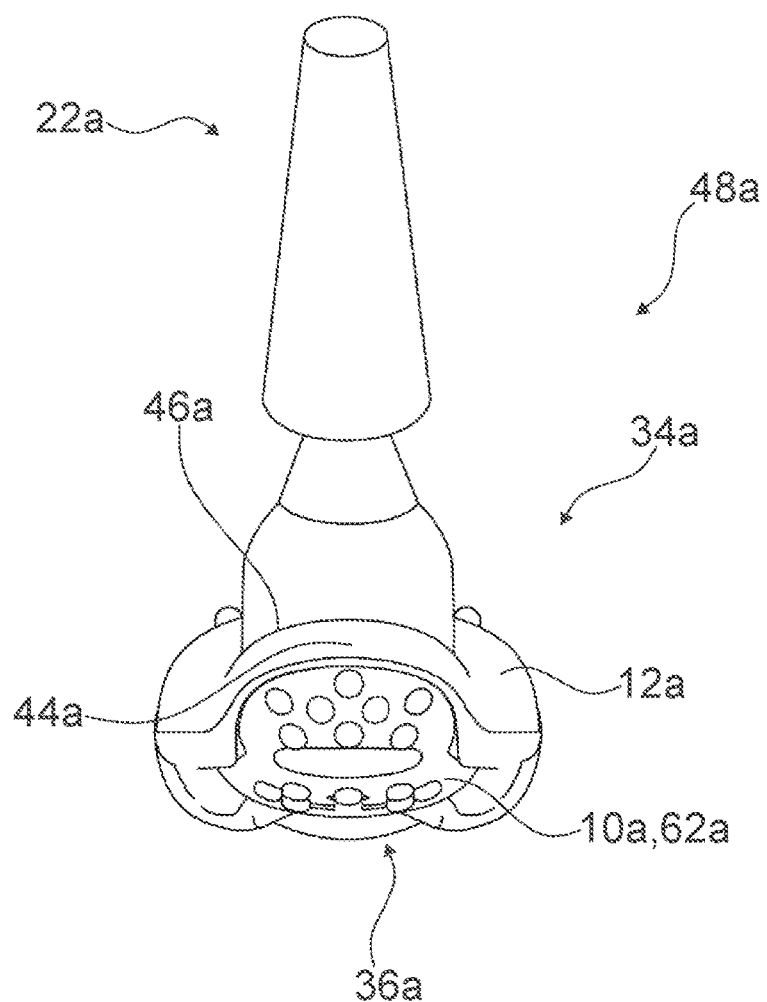
Figure 23:
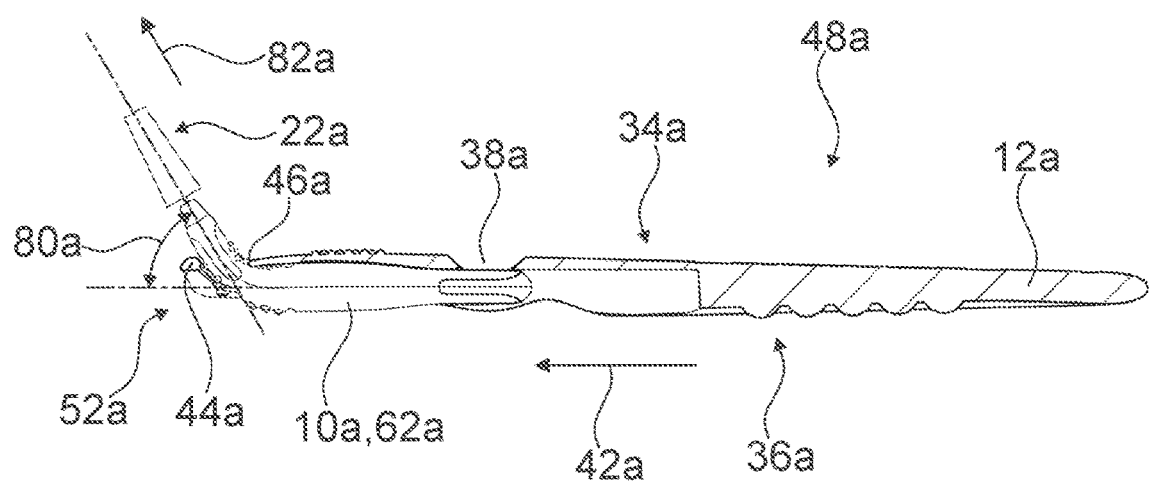
Figure 24:
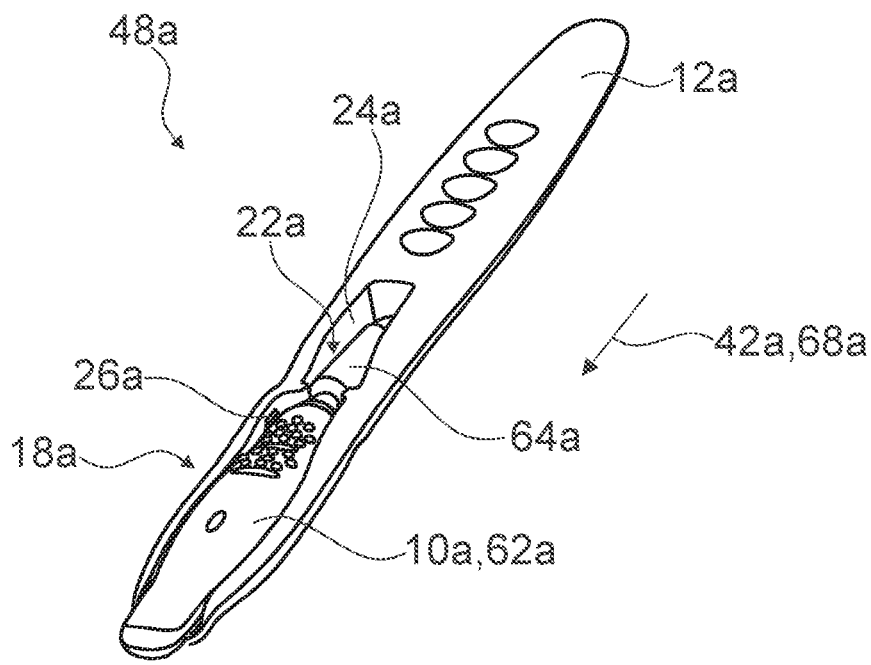
Figure 25:
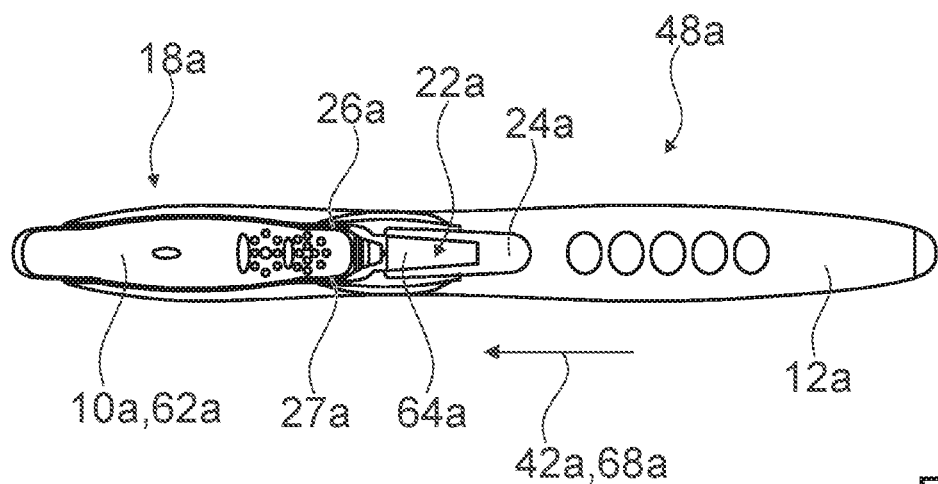
Figure 26:
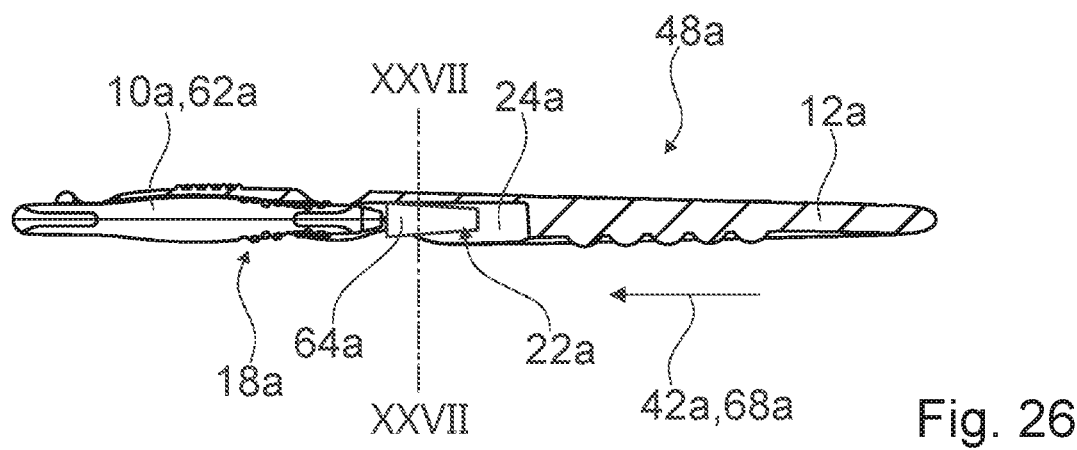
Figure 27:
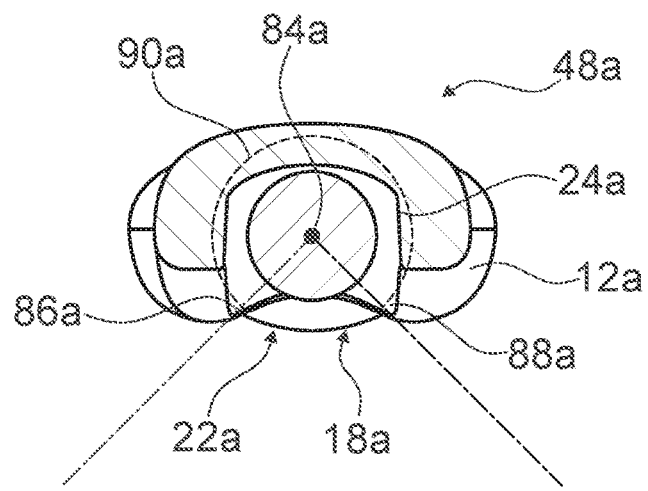
Figure 28:
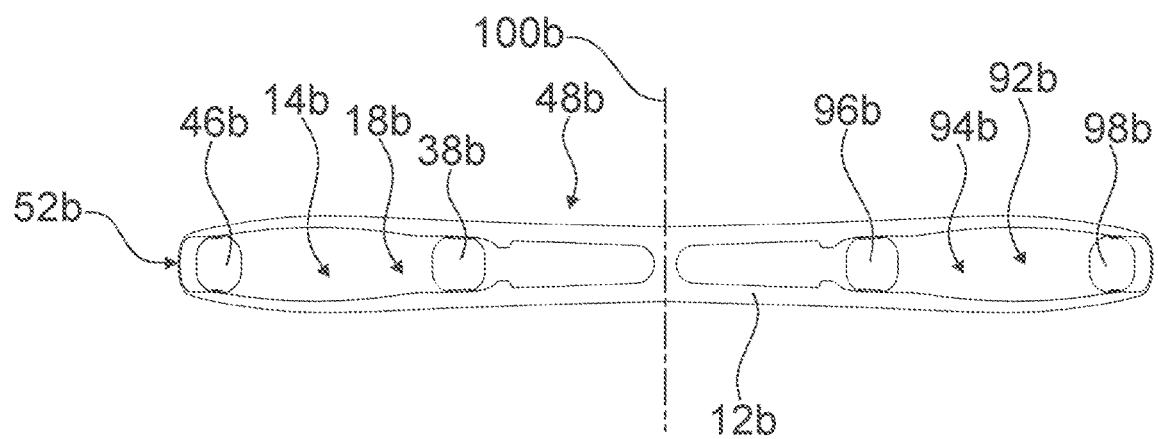
Figure 29:
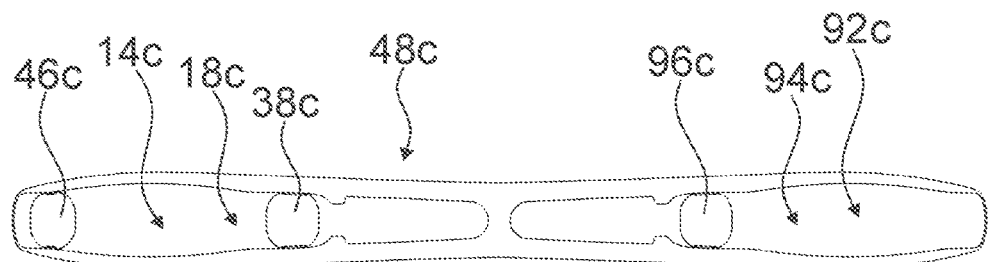
Figure 30:
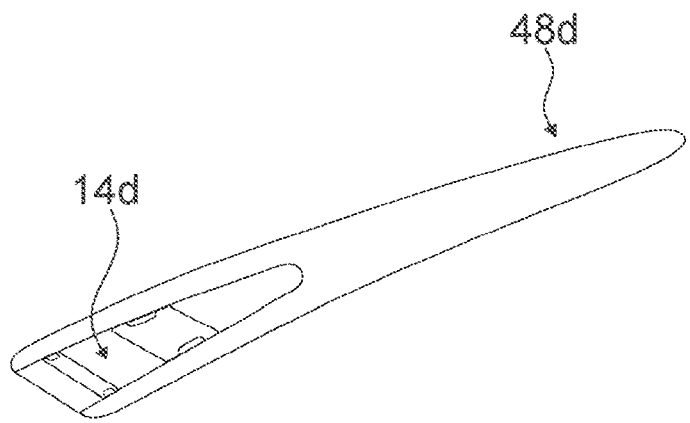
Figure 31:
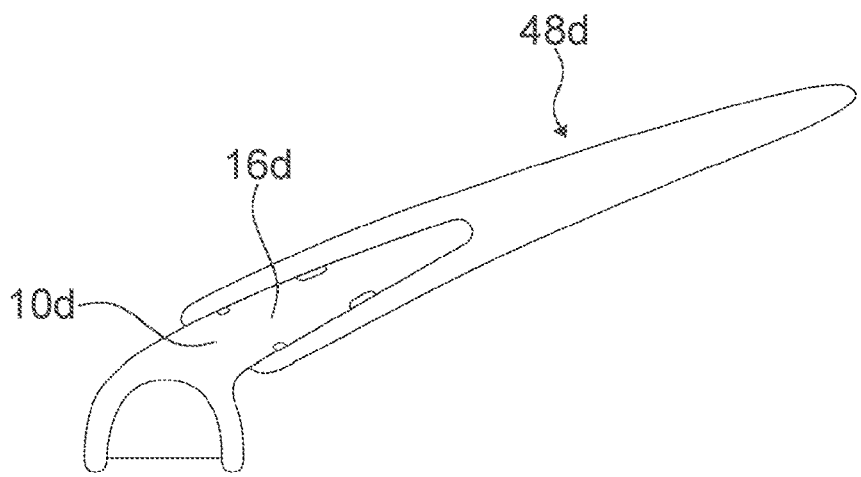
Figure 32:
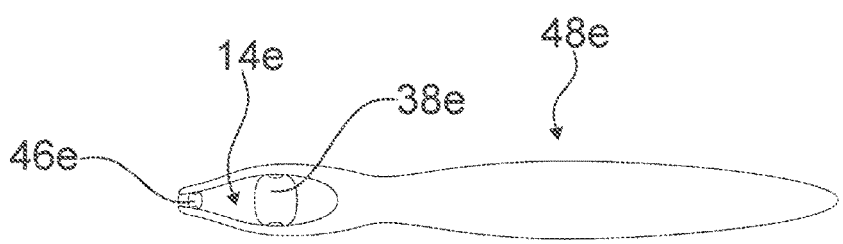
Figure 33:
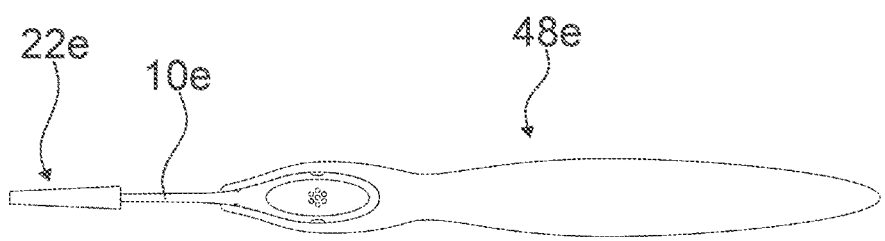
Figure 34:
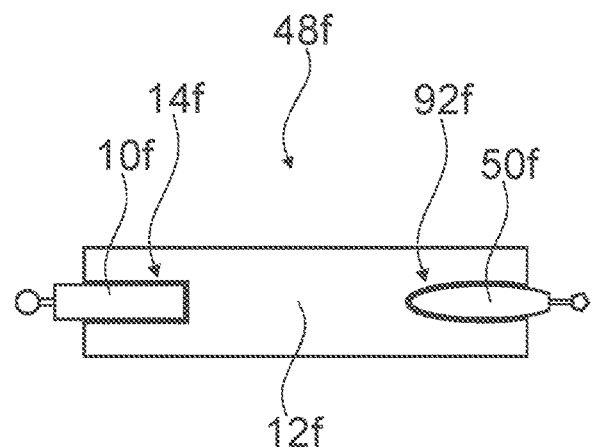
Figure 35:
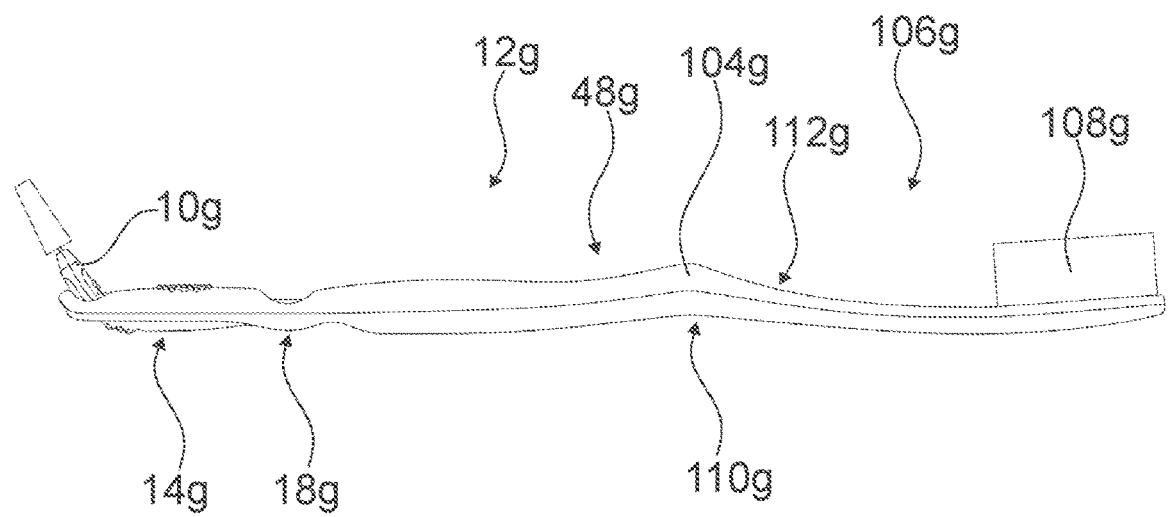

It is shown in:

FIG. 1 a first oral hygiene handle device in a perspective representation,

FIG. 2 the first oral hygiene handle device in a further perspective representation, FIG. 3 an underside of the first oral hygiene handle device in a schematic representation, FIG. 4 an upper side of the first oral hygiene handle device in a schematic representation, FIG. 5 the first oral hygiene handle device in a schematic side view, FIG. 6 the first oral hygiene handle device in a schematic front view, FIG. 7 the first oral hygiene handle device in a sectional side view, FIG. 8 the first oral hygiene handle device with an oral-hygiene means inlaid in an application position, in a perspective representation, FIG. 9 the first oral hygiene handle device with the oral-hygiene means inlaid in the application position, in a further perspective representation, FIG. 10 an upper side of the first oral hygiene handle device with the oral-hygiene means inlaid in the application position, in a schematic representation, FIG. 11 an underside of the first oral hygiene handle device with the oral-hygiene means inlaid in the application position, in a schematic representation, FIG. 12 the first oral hygiene handle device with the oral-hygiene means inlaid in the application position, in a schematic side view, FIG. 13 the first oral hygiene handle device with the oral-hygiene means inlaid in the application position, in a schematic front view, FIG. 14 the first oral hygiene handle device with the oral-hygiene means inlaid in the application position, in a sectional side view, FIG. 15 the first oral hygiene handle device with the oral-hygiene means inlaid in the application position, in a sectional view along a section plane XV-XV of FIG. 12, FIG. 16 the first oral hygiene handle device with the oral-hygiene means inlaid in the application position, in a sectional view along a section plane XVI-XVI of FIG. 12, FIG. 17 the first oral hygiene handle device with the oral-hygiene means inlaid in a further application position, in a perspective view, FIG. 18 the first oral hygiene handle device with the oral-hygiene means inlaid in the further application position, in a further perspective view, FIG. 19 an upper side of the first oral hygiene handle device with the oral-hygiene means inlaid in the further application position, in a schematic representation, FIG. 20 an underside of the first oral hygiene handle device with the oral-hygiene means inlaid in the further application position, in a schematic representation, FIG. 21 the first oral hygiene handle device with the oral-hygiene means inlaid in the further application position, in a schematic side view, FIG. 22 the first oral hygiene handle device with the oral-hygiene means inlaid in the further application position, in a schematic front view, FIG. 23 the first oral hygiene handle device with the oral-hygiene means inlaid in the further application position, in a sectional side view, FIG. 24 the first oral hygiene handle device with the oral-hygiene means inlaid in a stowage position, in a perspective view, FIG. 25 an upper side of the first oral hygiene handle device with the oral-hygiene means inlaid in the stowage position, in a schematic representation, FIG. 26 the first oral hygiene handle device with the oral-hygiene means inlaid in the stowage position, in a sectional side view, FIG. 27 the first oral hygiene handle device with the oral-hygiene means inlaid in the stowage position, in a sectional view along the section plane XXVII-XXVII of FIG. 26, FIG. 28 an underside of a second oral hygiene handle device in a schematic representation, FIG. 29 an underside of a third oral hygiene handle device in a schematic representation, FIG. 30 an underside of a fourth oral hygiene handle device in a schematic representation, FIG. 31 the underside of the fourth oral hygiene handle device with an oral-hygiene means inlaid in an application position, FIG. 32 an underside of a fifth oral hygiene handle device in a schematic representation, FIG. 33 the underside of the fifth oral hygiene handle device with an oral-hygiene means inlaid in an application position, FIG. 34 an underside of a sixth oral hygiene handle device with two differently implemented oral-hygiene means, in a schematic representation, and FIG. 35 a side view of a seventh oral hygiene handle device with an oral-hygiene means inlaid in an application position.

DESCRIPTION OF THE EXEMPLARY EMBODIMENTS

FIGS. 1 to 7 show different representations of a first oral hygiene handle device 48a. The oral hygiene handle device 48a is configured for holding an oral-hygiene means 10a. The oral hygiene handle device 48a comprises at least one base body 12a with at least one accommodation region 14a to accommodate the oral-hygiene means 10a in an application position (cf. also FIGS. 8 to 16). The accommodation region 14a is longer than 30 mm. In the present case the accommodation region 14a has a length of approximately 45 mm. The accommodation region 14a is configured to accommodate a handle element 16a of the oral-hygiene means 10a (cf. also FIGS. 8 to 16). In the present case a length of the accommodation region 14a extends parallel to a main extension direction 32a of the accommodation region 14a. In the present case the main extension direction 32a of the accommodation region 14a extends parallel to a main extension direction 42a of the base body 12a. The base body 12a comprises an upper side 34a. The base body 12a comprises an underside 36a, which is in particular situated opposite the upper side 34a. The accommodation region 14a is arranged on the underside 36a of the base body 12a. The accommodation region 14a is open towards a front face 52a of the base body 12a.

The base body 12a comprises at least one stowage region 18a, which is configured to accommodate the oral-hygiene means 10a in a stowage position. The accommodation region 14a partly implements the stowage region 18a. It is however also conceivable that the accommodation region 14a implements the stowage region 18a completely and/or that the accommodation region 14a and the stowage region 18a are embodied identically. In the present case the accommodation region 14a and the stowage region 18a are connected in a one-part implementation. Furthermore, in the present case the accommodation region 14a and the stowage region 18a are embodied as a shared recess of the base body 12a. The stowage region 18a comprises a first partial region 54a and a second partial region 56a. The first partial region 54a is implemented by the accommodation region 14a. The second partial region 56a is configured to accommodate a cleaning zone 22a of the oral-hygiene means 10a (cf. also FIGS. 8 to 16). The stowage region 18a has, on a side 20a facing away from the accommodation region 14a, a smaller cross section than the accommodation region 14a. In the present case the second partial region 56a of the stowage region 18a has a smaller cross section than the accommodation region 14a.

The accommodation region 14a comprises at least one fixation element 26a, which is configured for an at least partial fixation of the oral-hygiene means 10a in the application position and in the stowage position. The fixation element 26a is implemented as an elevation extending along at least one direction 28a over maximally 10% of an extension of the base body 12a along the direction 28a. In the present case the direction 28a extends perpendicularly to the main extension direction 42a of the base body 12a. In the present case the direction 28a furthermore extends at least substantially perpendicularly to the upper side 34a of the base body 12a. In the present case the fixation element 26a is embodied as a latch nub. The fixation element 26a has a larger extension along the main extension direction 42a of the base body 12a than along the direction 28a. It is however also conceivable that the fixation element 26a has a square or circle-shaped cross section. In the present case the accommodation region 14a comprises a second fixation element 27a, which is implemented mirror-symmetrically to the fixation element 26a. The second fixation element 27a is arranged on a side of the accommodation region 14a that is situated opposite the fixation element 26a.

The base body 12a comprises at least one gripping zone 30a, which at least partly overlies the accommodation region 14a in a projection perpendicularly to the main extension direction 32a of the accommodation region 14a, and in particular in parallel to the direction 28a. As is shown in particular in FIG. 7, the gripping zone 30a is arranged on the upper side 34a of the base body 12a, opposite the accommodation region 14a. In the present case the gripping zone 30a is connected with the base body 12a in a one-part implementation. The gripping zone 30a is further implemented as a nubbed handle. A rear side 58a of the gripping zone 30a at least partly implements the accommodation region 14a, in particular a shell surface 60a of the accommodation region 14a.

The base body 12a comprises at least one access opening 38a, which is arranged on the upper side 34a of the base body 12a opposite the accommodation region 14a, and through which the accommodation region 14a is at least partly accessible. Viewed from the front face 52a of the base body 12a, the access opening 38a is arranged behind the gripping zone 30a. The access opening 38a is connected with the gripping zone 30a in a one-part implementation. The fixation element 26a is arranged, along the main extension direction 42a of the base body 12a, in a location that is situated at a distance of maximally 5 mm from the access opening 38a, and in particular in a region of the access opening 38a. In particular, the fixation element 26a is accessible from the upper side 34a of the base body 12a through the access opening 38a. The same applies for the second fixation element 27a.

The base body 12a comprises at least one handle region 40a which is, in a projection perpendicularly to the main extension direction 32a of the accommodation region 14a, arranged at least partly beside the accommodation region 14a. The handle region 40a is arranged on the underside 36a of the base body 12a. Viewed from the front face 52a of the base body 12a, the handle region 40a is arranged behind the accommodation region 14a. The handle region 40a is implemented as a cannelated handle. In the present case the base body 12a comprises a second handle region 41a. The second handle region 41a is arranged opposite the handle region 40a, in particular when viewed perpendicularly to the main extension direction 42a. The handle region 40a and the second handle region 41a together realize a handle, which is configured to be held with a hand, in particular at least partly with a heel of a hand.

FIGS. 8 to 14 show different representations of a system with the first oral hygiene handle device 48a and with the oral-hygiene means 10a inlaid in an application position. The oral-hygiene means 10a comprises an oral-hygiene means base body 62a. The oral-hygiene means base body 62a comprises a gripping zone 66a, which is configured for holding the oral-hygiene means 10a in an alternative application, in particular an application without the oral hygiene handle device 48a. The oral-hygiene means 10a, in particular the oral-hygiene means base body 62a, comprises the handle element 16a with a length of at least 30 mm. In the present case the handle element 16a has a length of approximately 45 mm. The oral-hygiene means 10a moreover comprises the cleaning zone 22a with a cleaning element 64a. The cleaning element 64a is in the present case embodied as an interdental brush head. The cleaning element 64a is connected to the oral-hygiene means base body 62a.

In the application position, the oral-hygiene means base body 62a of the oral-hygiene means 10a is inlaid in the accommodation region 14a of the base body 12a. A main extension direction 68a of the oral-hygiene means 10a extends in the application position at least substantially parallel to the main extension direction 42a of the base body 12a. The oral-hygiene means 10a is in the application position at least partly fixated by the fixation element 26a. Furthermore, the oral-hygiene means 10a is in the application position at least partly fixated by the second fixation element 27a. Beyond this, the oral-hygiene means 10a is in the application position at least partly fixated by a third fixation element 70a. Moreover the oral-hygiene means 10a is in the application position at least partly fixated by a fourth fixation element 72a. The fixation elements 26a, 27a, 70a, 72a as well as the shell surface 60a of the accommodation region 14a fixate the oral-hygiene means base body 62a in the application position. It is however also conceivable that an oral-hygiene means is, in an application position and/or in a stowage position, fixated merely by fixation elements, and in particular otherwise without contact to a shell surface of an accommodation region. In the application position, the cleaning zone 22a of the oral-hygiene means 10a projects beyond the front face 52a of the base body 12a.

For inlaying the oral-hygiene means 10a in the accommodation region 14a of the base body 12a, the oral-hygiene means 10a is introducible in the accommodation region 14a perpendicularly to the main extension direction 42a of the base body 12a. During the inlaying the oral-hygiene means 10a latches with the fixation element 26a and in particular with the fixation elements 27a, 70a, 72a. For a demounting of the oral-hygiene means 10a, the oral-hygiene means 10a may be pushed, through the access opening 38a of the accommodation region 14a, in particular from the upper side 34a of the base body 12a, out of the accommodation region 14a towards the underside 36a of the base body 12a.

FIG. 15 shows the first oral hygiene handle device 48a, with the oral-hygiene means 10a inlaid in the application position, in a sectional view along a section plane XV-XV in FIG. 12. The oral-hygiene means base body 62a of the oral-hygiene means 10a is at least partly fixated in a region of the access opening 38a by the two fixation elements 26a, 27a. The oral-hygiene means base body 62a comprises in a central region 74a a hard component. The oral-hygiene means base body 62a further comprises respectively one soft component in an upper gripping zone 76a and in a lower gripping zone 78a. In the application position the upper gripping zone 76a of the oral-hygiene means base body 62a faces towards the upper side 34a of the base body 12a of the oral hygiene handle device 48a. Moreover, in the application position the lower gripping zone 78a of the oral-hygiene means base body 62a faces towards the underside 36a of the base body 12a.

FIG. 16 shows the first oral hygiene handle device 48a, with the oral-hygiene means 10a inlaid in the application position, in a sectional view along a section plane XVI-XVI in FIG. 12. The upper gripping zone 76a and the lower gripping zone 78a of the oral-hygiene means base body 62a are connected in a one-part implementation. The upper gripping zone 76a and the lower gripping zone 78a of the oral-hygiene means base body 62a fully encompass the central region 74a at least section-wise.

A shape of the accommodation region 14a of the base body 12a is, in particular on a rear side 58a of the gripping zone 30a that is situated opposite the gripping zone 30a, adapted to a shape of the oral-hygiene means 10a, in particular of the oral-hygiene means base body 62a. A cross section of the shell surface 60a of the accommodation region 14a encompasses a cross section of the oral-hygiene means base body 62a. In the application position the oral-hygiene means base body 62a is inlaid in the accommodation region 14a at least section-wise in a form-fit fashion.

FIGS. 17 to 23 show different representations of the first oral hygiene handle device 48a, with the oral hygiene means 10a inlaid in a further application position. The accommodation region 14a of the base body 12a of the oral hygiene handle device 48a is configured to accommodate the oral-hygiene means 10a in the further application position. The further application position differs from the application position. In the further application position the oral-hygiene means base body 62a of the oral-hygiene means 10a is partially inlaid in the accommodation region 14a of the base body 12a.

The accommodation region 14a is configured to support the cleaning zone 22a of the oral-hygiene means 10a in the further application position at an angle 80a relative to the main extension direction 42a of the base body 12a that differs from a corresponding angle in the application position. In the present case the angle 80a is approximately 60°. A main extension direction 82a of the cleaning zone 22a includes the angle 80a with the main extension direction 42a of the base body 12a.

The accommodation region 14a is configured, in the further application position, to support the oral-hygiene means 10a in a different location along the main extension direction 42a of the base body 12a than in the application position. In the present case the oral-hygiene means 10a is in the further application position arranged closer to the front face 52a of the base body 12a than in the application position. It is however also conceivable that an oral-hygiene means is in two different application positions supported respectively in the same location along a main extension direction of a base body, wherein in particular a cleaning zone includes in the two application positions respectively different angles with a main extension direction of the base body.

The accommodation region 14a comprises a fixation element 44a, which is configured for an at least partial fixation of the oral-hygiene means 10a in the application position and in the further application position. In the present case the fixation element 44a is embodied bracket-shaped. A shape of the fixation element 44a is at least partly adapted to a shape of the oral-hygiene means base body 62a. The fixation element 44a section-wise encompasses the oral-hygiene means 10a in the application position and in the further application position. Furthermore the fixation element 44a is configured for an at least partial fixation of the oral-hygiene means 10a in the application position and in the further application position. Moreover the fixation element 27a fixates the oral-hygiene means 10a in the application position and in the further application position at least partially. Alternatively or additionally it is conceivable that the accommodation region 14a comprises at least one fixation element that is embodied as a latch nub and fixates the oral-hygiene means in a plurality of application positions.

The base body 12a comprises at least one oral-hygiene means pass-through 46a, which the oral-hygiene means 10a at least partially extends through in the further application position. In the present case, the cleaning zone 22a of the oral-hygiene means 10a extends through the oral-hygiene means pass-through 46a in the further application position. Moreover, in the further application position the oral-hygiene means base body 62a at least partially passes through the oral-hygiene means pass-through 46a. The oral-hygiene means pass-through 46a is arranged on the upper side 34a of the base body 12a, opposite the accommodation region 14a. The accommodation region 14a, in particular the oral-hygiene means pass-through 46a, is configured to at least partly bend the oral-hygiene means 10a, in particular the oral-hygiene means base body 62a, in the further application position. For an inlaying of the oral-hygiene means 10a in the accommodation region 14a in the further application position, the cleaning zone 22a of the oral-hygiene means 10a is slid through the oral-hygiene means pass-through 46a from the underside 36a of the base body 12a. Then the oral-hygiene means base body 62a is then pushed past the fixation elements 26a, 27a. The oral-hygiene means base body 62a is then inlaid in the accommodation region 14a. For a demounting of the oral-hygiene means 10a, the oral-hygiene means 10a may be pushed, through the access opening 38a of the accommodation region 14a, in particular from the upper side 34a of the base body 12a, out of the accommodation region 14a towards the underside 36a of the base body 12a. Subsequently the oral-hygiene means 10a may be pulled out of the oral-hygiene means pass-through 46a towards the underside 36a of the base body 12a.

FIGS. 24 to 27 show the first oral hygiene handle device 48a, with the oral-hygiene means 10a inlaid in a stowage position, in different illustrations. In the stowage position the oral-hygiene means 10a is arranged in the stowage region 18a of the base body 12a. The cleaning zone 22a of the oral-hygiene means 10a is in the stowage position arranged in the second partial region 56a of the stowage region 18a.

The fixation element 26a is configured to at least partly fixate the oral-hygiene means 10a, in particular the oral-hygiene means base body 62a, in the application position and in the stowage position. The same applies to the fixation element 27a. In the stowage position the main extension direction 68a of the oral-hygiene means 10a runs at least substantially parallel to the main extension direction 42a of the base body 12a of the oral hygiene handle device 48a.

The stowage region 18a is configured for a contact-free support of the cleaning zone 22a of the oral-hygiene means 10a. In the stowage position the cleaning zone 22a of the oral-hygiene means 10a is arranged in the second partial region 56a of the stowage region 18a in a contact-free fashion. A minimum distance between the cleaning zone 22a of the oral-hygiene means 10a, in particular between the cleaning element 64a of the oral-hygiene means 10a, and the stowage region 18a is in the present case between 0.1 mm and 0.5 mm.

The stowage region 18a comprises a shell surface 24a, which encompasses the cleaning zone 22a of the oral-hygiene means 10a in at least one section plane, in particular in the section plane XXVII-XXVII indicated in FIG. 26, that is perpendicular to a main extension direction 42a of the base body 12a over an angle range of more than 180°. In particular, a central axis 84a of the cleaning zone 22a includes an angle 90a greater than 180° with points 86a, 88a of the shell surface 24a of the stowage region 18a, which are the farthest away from the upper side 34a of the base body 12a.

In FIGS. 28 to 34 six further exemplary embodiments of the invention are shown. The following descriptions and the drawings are substantially limited to the differences between the exemplary embodiments wherein, regarding identically designated structural components, in particular regarding structural components having the same reference numerals, the drawings and/or the description of the other exemplary embodiments, in particular of FIGS. 1 to 27, may principally be referred to. To distinguish between the exemplary embodiments, the letter a has been added to the reference numerals of the exemplary embodiment in FIGS. 1 to 27. In the exemplary embodiments of FIGS. 28 to 34 the letter a has been substituted by the letters b to g.

FIG. 28 shows an underside 36b of a second oral hygiene handle device 48b in a schematic representation. The oral hygiene handle device 48b comprises a base body 12b with a first accommodation region 14b. The base body 12b comprises a first stowage region 18b. The first stowage region 18b is connected with the first accommodation region 14b in a one-part implementation. The accommodation region 14b and the stowage region 18b are implemented in the same fashion as in the exemplary embodiment of FIGS. 1 to 27. In particular, the first accommodation region 14b comprises a first access opening 38b as well as a first oral-hygiene means pass-through 46b. The base body 12b comprises a second accommodation region 92b. Furthermore the base body 12b comprises a second stowage region 94b. The second accommodation region 92b and the second stowage region 94b are embodied analogously with the first accommodation region 14b and the first stowage region 18b. In particular, the second accommodation region 92b comprises a second access opening 96b as well as a second oral-hygiene means pass-through 98b. Viewed from a front face 52b of the base body 12b, the second accommodation region 92b and the second stowage region 94b are arranged behind the first accommodation region 14b and the first stowage region 18b. The base body 12b is in the present case implemented mirror-symmetrically with respect to a plane 100b. It is however also possible to implement the regions not exactly mirror-symmetrically, and in particular to achieve different application angles by way of differently positioning of the oral-hygiene means pass-throughs 46b and 98b relative to the respective end.

FIG. 29 shows an underside 36c of a third oral hygiene handle device 48c in a schematic representation. The third oral hygiene handle device 48c comprises a first accommodation region 14c and a first stowage region 18c. The first accommodation region 14c comprises a first access opening 38c as well as a first oral-hygiene means pass-through 46c. The third oral hygiene handle device 48c further comprises a second accommodation region 92c and a second stowage region 18c. The second accommodation region 92c comprises a second access opening 96c. The third oral hygiene handle device 48c is embodied in a principally analogous manner to the second oral hygiene handle device 48b of the exemplary embodiment of FIG. 28. However, the second accommodation region 92c does not comprise an oral-hygiene means pass-through. The first accommodation region 14c is configured to accommodate an oral-hygiene means, for example an oral-hygiene means as has been described for the exemplary embodiment of FIGS. 1 to 27, in at least two different application positions. The second accommodation region 92c is configured for an accommodation of an oral-hygiene means in only one application position. The second stowage region 94c may furthermore be used for supporting an oral-hygiene means in a stowed state. Thus a first oral-hygiene means may, for example, be arranged in the first accommodation region 14c in one of the possible application positions and simultaneously a second oral-hygiene means, which is in particular identical to the first oral-hygiene means, may be supported in the second stowage region 94c. It is in particular conceivable that a base body comprises a stowage region which has a depth that is equivalent to a multiple of a thickness of an oral-hygiene means that is to be stowed. In this way a plurality of oral-hygiene means may be stowed above each other and/or side by side with each other in the same stowage region. The stowage region may furthermore be configured in such a way that it is either possible to accommodate different oral-hygiene means in some locations or in each location, or that it is possible to accommodate a plurality of different oral-hygiene means above each other, e.g. in defined stowage regions which are situated one above the other one. It is, for example, possible to accommodate one to ten oral-hygiene means in these two ways.

FIG. 30 shows an underside 36d of a fourth oral hygiene handle device 48d in a schematic representation. The oral hygiene handle device 48d comprises an accommodation region 14d configured to accommodate an oral-hygiene means 10d, which is embodied as a flosser, in an application position (cf. also FIG. 31).

FIG. 31 shows the fourth oral hygiene handle device 48d, with the oral-hygiene means 10d inlaid in an application position, in a schematic representation. The oral-hygiene means 10d is embodied as a flosser. In the application position a handle element 16d of the oral-hygiene means 10d is fixated in the accommodation region 14d.

FIG. 32 shows an underside 36e of a fifth oral hygiene handle device 48e in a schematic representation. The oral hygiene handle device 48e comprises an accommodation region 14e, which is configured for an accommodation of an oral-hygiene means 10e, which is embodied as an interdental cleaner, in an application position. The accommodation region 14e comprises an access opening 38e as well as an oral-hygiene means pass-through 46e. The accommodation region 14*e* is configured for an accommodation of the oral-hygiene means 10*e* in a further application position that differs from the application position. In the further application position a cleaning zone 22*e* of the oral-hygiene means 10*e* extends through the oral-hygiene means pass-through 46*e*, analogously to the exemplary embodiment of FIGS. 1 to 27.

FIG. 33 shows the fifth oral-hygiene handle device 48*e*, with the oral-hygiene means 10*e* inlaid in an application position, in a schematic representation. The oral-hygiene means 10*e* is embodied as an interdental cleaner.

FIG. 34 shows a system with an oral hygiene handle device 48*f*, with an oral-hygiene means 10*f* and with a further oral-hygiene means 50*f*, which differs from the first oral-hygiene means 10*f*, in a schematic representation. The oral hygiene handle device 48*f* comprises a base body 12*f* with a first accommodation region 14*f* and with a second accommodation region 92*f*. The first accommodation region 14*f* is configured for an accommodation of the oral-hygiene means 10*f* in an application position. The second accommodation region 92*f* is configured for an accommodation of the further oral-hygiene means 50*f* in a further application position. In particular, the first accommodation region 14*f* and the second accommodation region 92*f* may be implemented identically or differently. It is further conceivable that the base body comprises at least one stowage region, which is configured for an accommodation of at least one of the oral-hygiene means in at least one stowage position.

In FIG. 35 a side view of a seventh oral hygiene handle device 48*g* with an oral-hygiene means 10*g* is shown. The seventh oral hygiene handle device 48*g* is part of a toothbrush handle 104*g* of a toothbrush 106*g*. In an application position the oral-hygiene means 10*g* is inlaid in an accommodation region 14*g* of a base body 12*g* of the oral hygiene handle device 48*g*. The toothbrush 106*g* comprises a bristle region 108*g*, which is shown only schematically. The accommodation region 14*g* of the oral-hygiene handle device 48*g* is arranged opposite the bristle region 108*g*. Analogously to the exemplary embodiment of FIGS. 1 to 27, the oral-hygiene handle device 48*g* comprises a stowage region 18*g* for an accommodation of the oral-hygiene means 10*g* in at least one stowage position. If the first oral-hygiene means 10*g* is arranged in the stowage region 18*g*, the oral hygiene handle device 48*g* serves at least partially as a handle for the toothbrush 104*g*. A thumb support surface 110*g* and a transition 112*g* to a neck of the toothbrush are also explicitly visible.

The invention claimed is:

1. An oral hygiene handle device, which is configured for a holding of an oral-hygiene means with at least one base body comprising at least one accommodation region for an accommodation of the oral-hygiene means in an application position, wherein:

the at least one accommodation region of the at least one base body is longer than 30 mm, and is configured for an accommodation of a handle element of the oral-hygiene means, the oral-hygiene means is embodied as an exchangeable part, which is usable without the oral hygiene handle device, the at least one base body comprises at least one stowage region for an accommodation of the oral-hygiene means in a stowage position, the at least one accommodation region comprises at least one fixation element, which is configured for an at least partial fixation of the oral-hygiene means in the application position and in the stowage position, the at least one fixation element is embodied as a latch nub, and the at least one accommodation region is configured for an accommodation of the oral-hygiene means in a further application position that differs from the application position.

2. An oral hygiene handle device according to claim 1, wherein the at least one accommodation region implements the at least one stowage region at least partly.

3. The oral hygiene handle device according to claim 1, wherein the at least one stowage region has, on a side facing away from the at least one accommodation region, a smaller cross section than the at least one accommodation region.

4. The oral hygiene handle device according to claim 1, wherein the at least one stowage region is configured for a contact-free support of a cleaning zone of the oral-hygiene means.

5. The oral hygiene handle device according to claim 4, wherein the at least one stowage region comprises a shell surface, which encompasses the cleaning zone of the oral-hygiene means, in at least one section plane that is perpendicular to a main extension direction of the at least one base body, over an angle range of more than 180°.

6. The oral hygiene handle device according to claim 1, wherein the at least one fixation element is embodied as an elevation extending along at least one direction over maximally 10% of an extension of the at least one base body along the direction.

7. The oral hygiene handle device according to claim 1, wherein the at least one base body comprises at least one gripping zone which, in a projection perpendicularly to a main extension direction of the at least one accommodation region, at least partially overlies the at least one accommodation region.

8. The oral hygiene handle device according to claim 7, wherein the at least one gripping zone is arranged on an upper side of the at least one base body opposite the at least one accommodation region.

9. The oral hygiene handle device according to claim 8, wherein the at least one base body comprises at least one access opening, which is arranged on the upper side of the at least one base body, opposite the at least one accommodation region, and through which the at least one accommodation region is at least partially accessible.

10. The oral hygiene handle device according to claim 1, wherein the at least one base body comprises at least one handle region which is, in a projection perpendicularly to a main extension direction of the at least one accommodation region, arranged at least partly beside the at least one accommodation region.

11. The oral hygiene handle device according to claim 1, wherein the at least one accommodation region is configured, in the further application position, to support a cleaning zone of the oral-hygiene means at an angle relative to a main extension direction of the at least one base body that differs from such an angle in the application position.

12. The oral hygiene handle device according to claim 1, wherein the at least one accommodation region is configured to support the oral-hygiene means in the further application position in a different location along a main extension direction of the at least one base body than in the application position.

13. The oral hygiene handle device according to claim 1, wherein the at least one accommodation region comprises at least one fixation element, which is configured for an at least partial fixation of the oral-hygiene means in the application position and in the further application position.

14. The oral hygiene handle device according to claim 1, wherein the at least one base body comprises at least one oral-hygiene means pass-through, through which the oral-hygiene means at least partly extends in the further application position.

15. The oral hygiene handle device according to claim 14, wherein the oral-hygiene means pass-through is arranged on an upper side of the at least one base body, opposite the at least one accommodation region.

16. The oral hygiene handle device according to claim 1, wherein the at least one accommodation region is configured to at least partly bend the oral-hygiene means in the further application position.

17. A system with at least one oral hygiene handle device according to claim 1, and with at least one oral-hygiene means.

18. The system according to claim 17, wherein the at least one oral-hygiene means comprises at least one handle element having a length of at least 30 mm.

19. The system according to claim 17, comprising at least one further oral-hygiene means, which is implemented differently from the at least one oral-hygiene means.

20. A tooth brush with at least one bristle region and with at least one oral hygiene handle device according to claim 1, whose at least one accommodation region is arranged opposite the bristle region.

* * * * *